United States Patent
Giacalone et al.

(10) Patent No.: US 6,930,689 B1
(45) Date of Patent: Aug. 16, 2005

(54) HARDWARE EXTENSIONS FOR IMAGE AND VIDEO PROCESSING

(75) Inventors: Jean-Pierre Giacalone, Vence (FR); Herve Daniel, Biot (FR)

(73) Assignee: Texas Instruments Incorporated, Dallas, TX (US)

( * ) Notice: Subject to any disclaimer, the term of this patent is extended or adjusted under 35 U.S.C. 154(b) by 350 days.

(21) Appl. No.: 09/748,512

(22) Filed: Dec. 26, 2000

(51) Int. Cl.⁷ ............................................. G06F 15/16
(52) U.S. Cl. .................. 345/502; 345/520; 348/395.1; 348/407.1; 348/416.1; 382/236; 382/250
(58) Field of Search ................................ 345/503, 520, 345/555; 375/240, 240.18, 240.2; 382/232, 233, 236, 235, 250; 398/14.13, 14.15, 394.1, 395.1, 402.1, 407.1, 415.1, 416.1

(56) References Cited

U.S. PATENT DOCUMENTS

| | | | | |
|---|---|---|---|---|
| 5,528,528 A | * | 6/1996 | Bui | 708/400 |
| 5,790,208 A | * | 8/1998 | Kwak et al. | 348/699 |
| 5,854,984 A | | 12/1998 | Buhrmann et al. | |
| 5,920,353 A | * | 7/1999 | Diaz et al. | 375/240.15 |
| 5,930,526 A | * | 7/1999 | Iverson | 710/33 |
| 5,987,590 A | * | 11/1999 | Wing So | 712/35 |
| 6,128,307 A | | 10/2000 | Brown | |
| 6,223,274 B1 | * | 4/2001 | Catthoor et al. | 712/34 |
| 6,229,850 B1 | * | 5/2001 | Linzer et al. | 375/240.11 |
| 6,230,278 B1 | | 5/2001 | Li et al. | |
| 6,249,548 B1 | * | 6/2001 | Kleihorst et al. | 375/240.17 |
| 6,473,460 B1 | * | 10/2002 | Topper | 375/240.16 |
| 6,493,392 B1 | * | 12/2002 | Chung et al. | 375/240.27 |
| 6,587,590 B1 | * | 7/2003 | Pan | 382/250 |
| 2002/0059481 A1 | * | 5/2002 | Nunally | 710/5 |

* cited by examiner

*Primary Examiner*—Ulka J. Chauhan
(74) *Attorney, Agent, or Firm*—Ronald O. Neerings; Wade James Brady, III; Frederick J. Telecky, Jr.

(57) ABSTRACT

A processing device (200) includes three hardware extensions: a motion estimation extension 202, a pixel interpolation extension 204 and a DCT/iDCT extension 206. The hardware extensions perform functions which would otherwise be highly processor intensive, resulting in high power consumption and/or low quality video/imaging processing. The processing device 200 could be used, for example, in a mobile videophone 150.

15 Claims, 13 Drawing Sheets

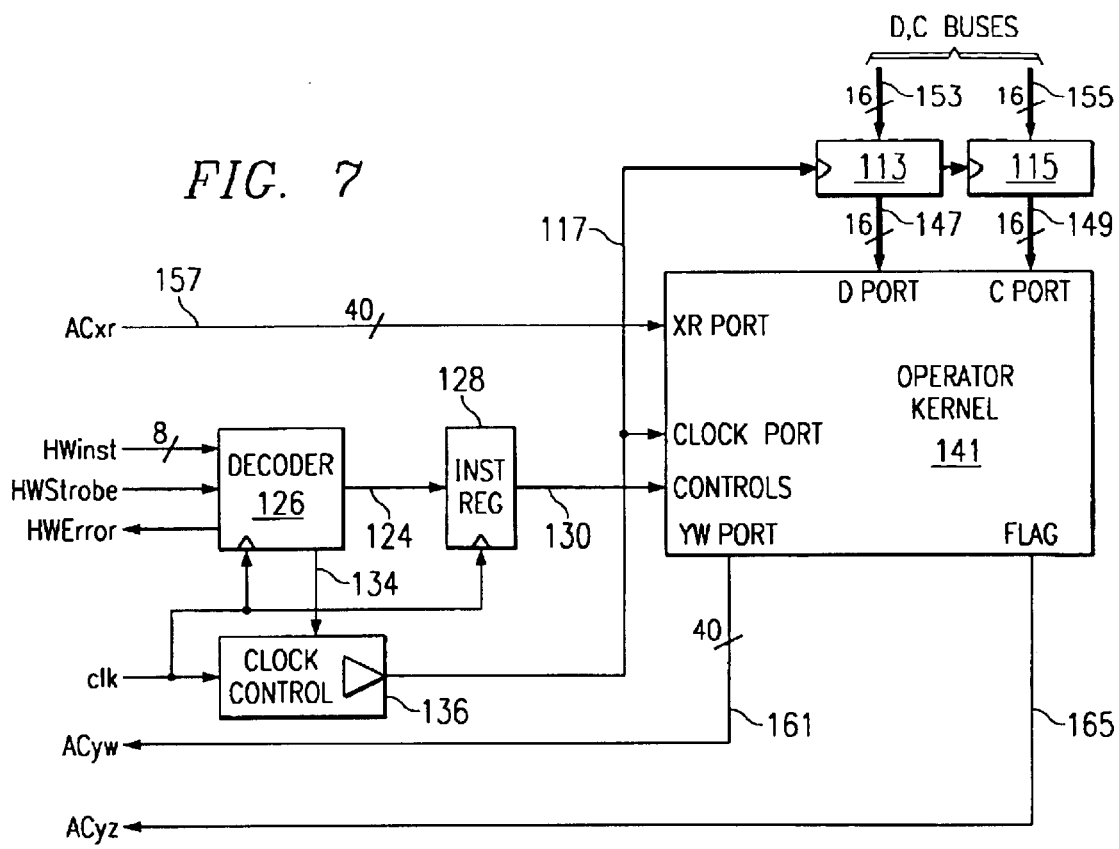
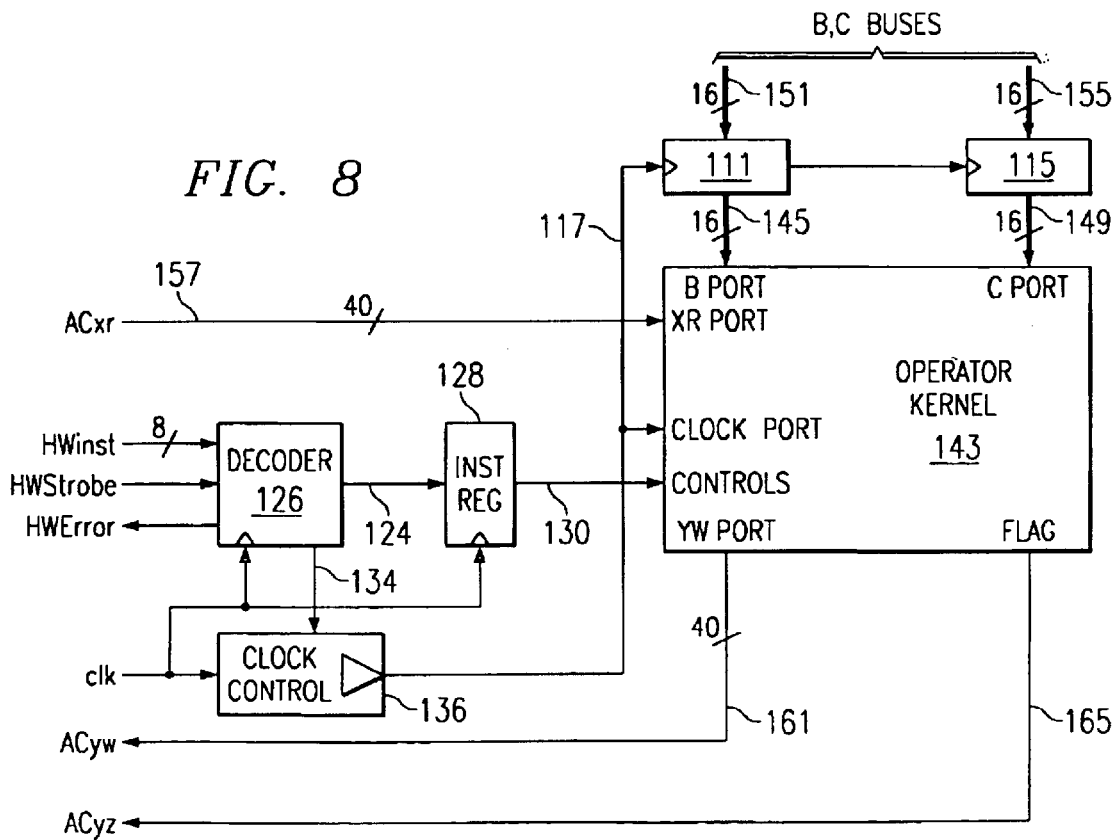

HARDWARE EXTENSIONS FOR IMAGE AND VIDEO PROCESSING

CROSS-REFERENCE TO RELATED APPLICATIONS

This application is related to U.S. Ser. No. 09/410,768 to Giacalone et al, filed Oct. 1, 1999, which is incorporated by reference herein.

STATEMENT OF FEDERALLY SPONSORED RESEARCH OR DEVELOPMENT

Not Applicable

BACKGROUND OF THE INVENTION

1. Technical Field

This invention relates in general to digital signal processors and, more particularly, to a digital signal process with hardware extensions for accelerating image and video processing.

2. Description of the Related Art

Signal processing generally refers to the performance of real-time operations on a data stream. Accordingly, typical signal processing applications include or occur in telecommunications, image processing, speech processing and generation, spectrum analysis and audio processing and filtering. In each of these applications, the data stream is generally continuous. Thus, the signal processor must produce results, "throughput", at the maximum rate of the data stream.

Conventionally, both analog and digital systems have been utilized to perform many signal processing functions. Analog signal processors, though typically capable of supporting higher throughput rates, are generally limited in terms of their long term accuracy and the complexity of the functions that they can perform. In addition, analog signal processing systems are typically quite inflexible once constructed and, therefore, best suited only to singular application anticipated in their initial design.

A digital signal processor provides the opportunity for enhanced accuracy and flexibility in the performance of operations that are very difficult, if not impracticably complex, to perform in an analog system. Additionally, digital signal processor systems typically offer a greater degree of post-construction flexibility than their analog counterparts, thereby permitting more functionally extensive modifications to be made for subsequent utilization in a wider variety of applications. Consequently, digital signal processing is preferred in many applications.

One of the most problematic applications for a DSP or other processor is digital video and image processing. Because of the large amount of information in a video, or even a single image, compression and decompression techniques (sometimes referred to as "codecs") are used to reduce the amount of information associated with an image or video. Some image codec techniques are non-lossy, i.e., the compressed information can be decompressed to an exact copy of the original digitized image; however, many image compression techniques are lossy, i.e., the resulting image or video has slight variations from the original, which are hopefully not noticeable to the user. If the original video stream is a live video stream, the quality of the codec is largely dependent upon the efficiency of the compression, since the video stream must be compressed in real time.

Compression and decompression techniques are used in a number of devices. Satellite television, for example, uses MPEG-2 compression techniques to increase the amount of information which can be sent over a limited frequency band. More recently, mobile communications devices are under development to send and receive image and video information. These devices generally include capabilities conventionally associated with a cellular phone and a personal computer. Using a mobile communication device, a user may upload and download information via a global communication network, such as the Internet. If the mobile communication device has video sourcing hardware, such as a CCD (charged coupled device) or CMOS (complementary metal over semiconductor) imaging circuitry, it may be used to send and receive images with another similarly equipped mobile communications device or computing device.

However, software codecs can be very processor dependent. Accordingly, the processing capabilities of a mobile communications device can be strained in order to compress and decompress image or video information in an acceptable manner. Further, because the software codec is so processor intensive, large amounts of power are necessary. Since mobile communications devices generally have relatively small batteries, power consumption is a major impediment to providing video communications.

Therefore, a need has arisen for method and apparatus for providing high-quality, low power, video and image processing.

BRIEF SUMMARY OF THE INVENTION

In the present invention, circuitry is provided for processing images and video, comprising a random access memory, a motion estimation hardware accelerator coupled to said random access memory, a pixel interpolation hardware accelerator coupled to said random access memory, and a discrete cosine transform hardware accelerator coupled to said random access memory. A processor coupling the hardware accelerators to said random access memory executes software instructions for processing images and video, wherein some of the instructions initiate functions performed by one or more of said hardware accelerators.

The present invention provides significant advantages over the prior art. First, the hardware accelerators are much more efficient in performing computation-intensive functions than a standard processing core; hence, the functions can be calculated much faster, and at lower power consumption. Second, the additional cost in hardware is very small.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 7 is a block diagram of hardware accelerator 102, according to another embodiment of the invention in which dataflow mode is ACy=copr(Acx,Xmem,Ymem) or ACy=copr(Acx,Lmem).

FIG. 8 is a block diagram of hardware accelerator 102, according to another embodiment of the invention in which the dataflow mode is ACy=copr(Acx,Ymem,Coef).

FIGS. 23a through 24c illustrate a 4-points DCT kernel, an 8-points DCT kernel and a 4-points iDCT kernel, respectively.

FIG. 24 illustrates a sequence of operation for a DCT or iDCT function.

DETAILED DESCRIPTION OF THE INVENTION

The present invention is best understood in relation to FIGS. 1–26 of the drawings, like numerals being used for like elements of the various drawings.

FIGS. 1–16 illustrate embodiments of a processor with hardware extensions, which is discussed in greater detail in U.S. Ser. No. 09/410,768 to Giacalone et al, filed Oct. 1, 1999, entitled "Hardware Accelerator/Acceleration for Processing systems", which incorporated by reference herein.

Figure 1:
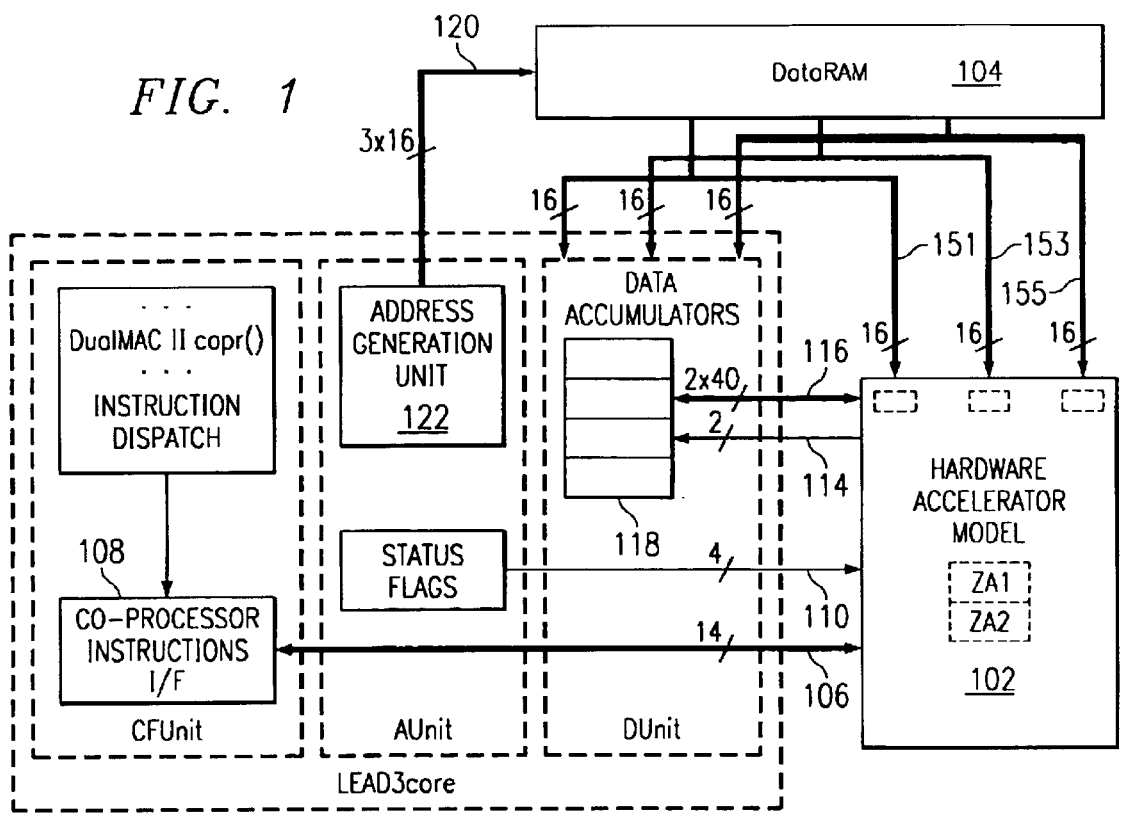
FIG. 1 is a block diagram of a data processing system according to one embodiment of the invention.

FIG. 1 illustrates an apparatus in which a hardware accelerator 102 couples a processor 12 (a TI-DSP C55X, according to a preferred embodiment of the invention) to a data RAM 104, in a scheme that improves processing efficiency over that available in the prior art, according to one embodiment of the invention. Sixteen-bit data buses 151, 152 and 153 couple hardware accelerator 102 to random access memory "RAM" 104 and to data accumulators 118. A thirteen-bit data bus 106 couples hardware accelerator 102 to co-processor instructions I/F of processor 108. A four-bit data bus 110 couples hardware accelerator 102 to status flags 112 of processor 108. A two-bit data bus 114 and a 2×40 bit data bus 116 couple hardware accelerator 102 to data accumulator 118 and a 3×16 bit address bus 120 couples address generation unit 122 to RAM 104. A pin list of the module and meaning is shown in table 1.

TABLE 1

| PIN NAME | FUNCTION | DIRECTION | SIZE |
|---|---|---|---|
| clk: | System clock | IN | 1 |
| bbus: | data read using B pointer in RAM (coeff) | IN | 16 |
| cbus: | data read using C pointer in RAM (Xmem) | IN | 16 |
| dbus: | data read using D pointer in RAM (Ymem) | IN | 16 |
| ACxr: | ACx data read | IN | 40 |
| ACxw: | ACx data write | OUT | 40 |
| ACxz: | ACz zero | OUT | 1 |
| ACyr: | ACy data read | IN | 40 |
| ACyw: | ACy data write | OUT | 40 |
| ACyz: | ACy zero | OUT | 1 |
| HWStatus: | M40, RDM, SATD and SXMD flags | IN | 4 |
| Hwinst: | Hardware accelerator instruction | IN | 8 |
| HWstrobe: | Hardware accelerator instruction strobe | IN | 1 |
| Hwbshaden: | Update of HWA's B bus shadow | IN | 1 |
| Hwcshaden: | Update of HWA's C bus shadow | IN | 1 |
| Hwdshaden: | Update of HWA's D bus shadow | IN | 1 |
| HWstallw: | Stall due to data write in the pipeline | IN | 1 |
| HWerror: | Hardware aocelerator error to CPU | OUT | 1 |

Figure 2:
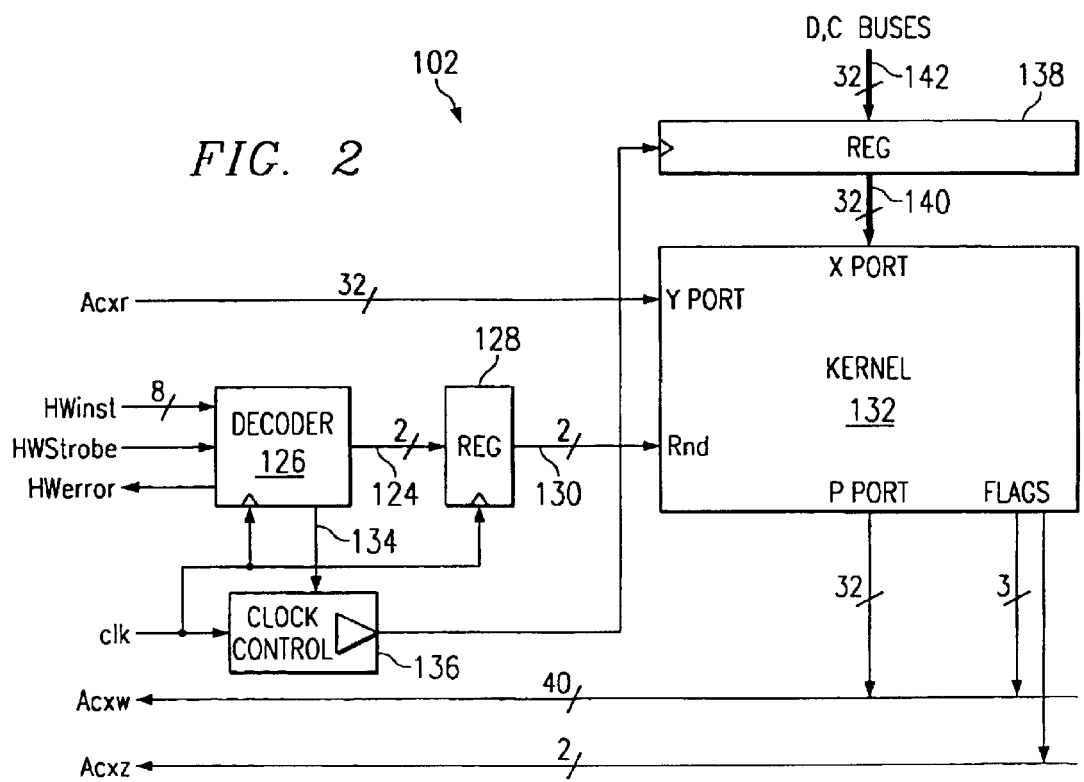
FIG. 2 is a schematic diagram of hardware accelerator 102 of FIG. 1, according to one embodiment of the invention.

FIG. 2 is a block diagram of hardware accelerator 102, according to one embodiment of the invention. Bus 124 couples decoder 126 to register 128. Bus 130 couples register 128 to the Rnd input of kernel 132. A lead line 134 couples decoder 126 to clock control 136. A lead line 117 couples clock control 136 to register 138. A bus 140 couples register 138 to the X port of kernel 132. A bus 142 couples register 138 to the D and C buses (not shown). The Y port of kernel 132 is coupled to bus 199 (ACxr). The P port of kernel 132 is coupled bus 121, which is coupled to bus 127 (ACxw). One Flag output of kernel 132 is coupled to bus 123, which is coupled to bus 127, and another Flag output of kernel 132 is coupled to a signal line 125, which is coupled to bus 129 (ACxz) to receive an "ACxr" bus and coupled to output an "ACxw" bus and an "ACxz" signal. Decoder 126 is coupled to receive an "Hwinst" signal and an "HWStrobe" signal and coupled to output an "HWerror" signal. Decoder 126, register 128 and clock control 136 are all coupled to receive a clock signal.

Figure 3:
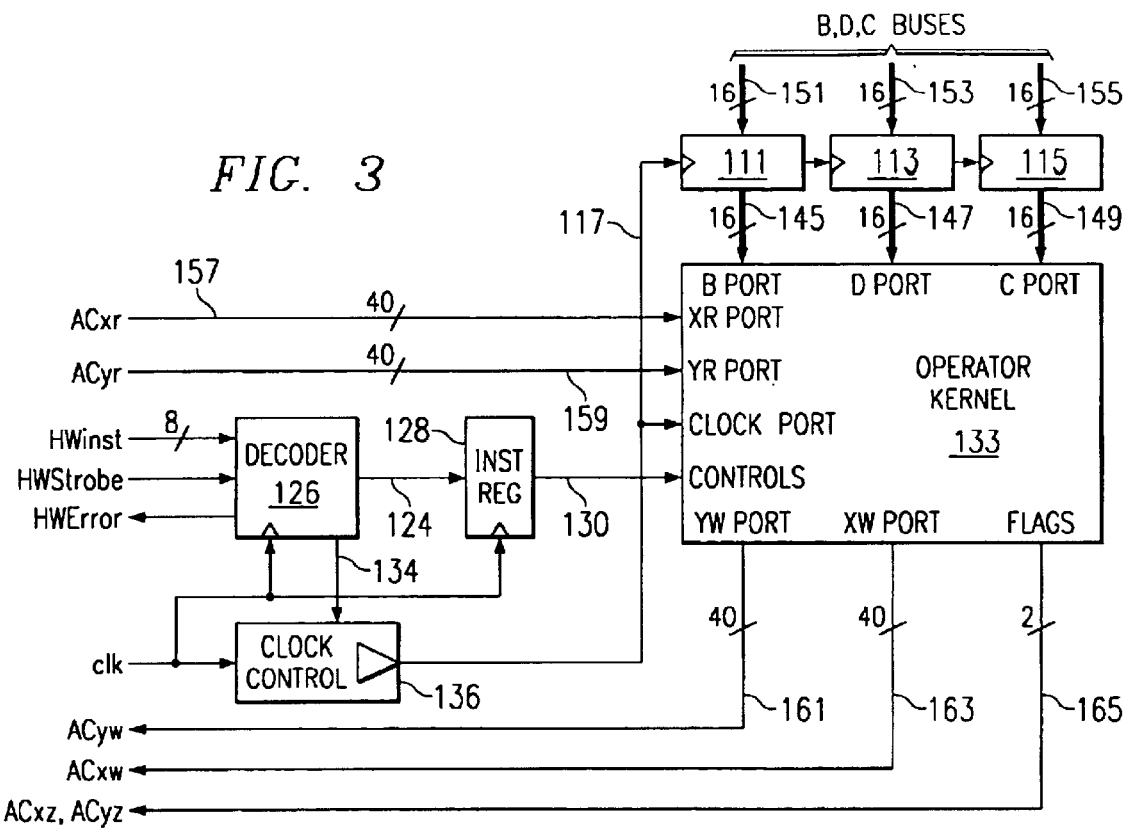
FIG. 3 is a block diagram of hardware accelerator 102, according to another embodiment of the invention in which the data flow mode is [Acx,ACy]=copr(Acx,ACy,Xmem, Ymem,Coef).

FIG. 3 is a block diagram of hardware accelerator 102, according to another embodiment of the invention in which the data flow mode is [Acx,ACy]=copr(Acx,ACy,Xmem, Ymem,Coef). Bus 124 couples decoder 126 to register 128. Bus 130 couples register 128 to operator kernel 133. A lead line 134 couples decoder 126 to clock control 136. A lead line 117 couples clock control 136 to register 139 and to the clock port of operator kernel 133. A bus 145 couples register 111 to the B port of operator kernel 133. A bus 147 couples register 113 to the D port of operator kernel 133. A bus 149 couples register 115 to the C port of operator kernel 133. Register 111 is coupled to bus 151 (B bus), register 113 is coupled to bus 153 (D bus), register 115 is coupled to bus 155 (C bus) and registers 111, 113 and 115 are also coupled to each other. The XR port of operator kernel 133 is coupled to bus 157 (ACxr). The YR port of bus operator kernel 133 is coupled to bus 159 (ACyr). The YW port of operator kernel 133 is coupled to bus 161 (ACyw). The XW port of operator kernel 133 is coupled to bus 163 (ACxw). The flags output of operator kernel 133 is coupled to bus 165 (ACxz, ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 4:
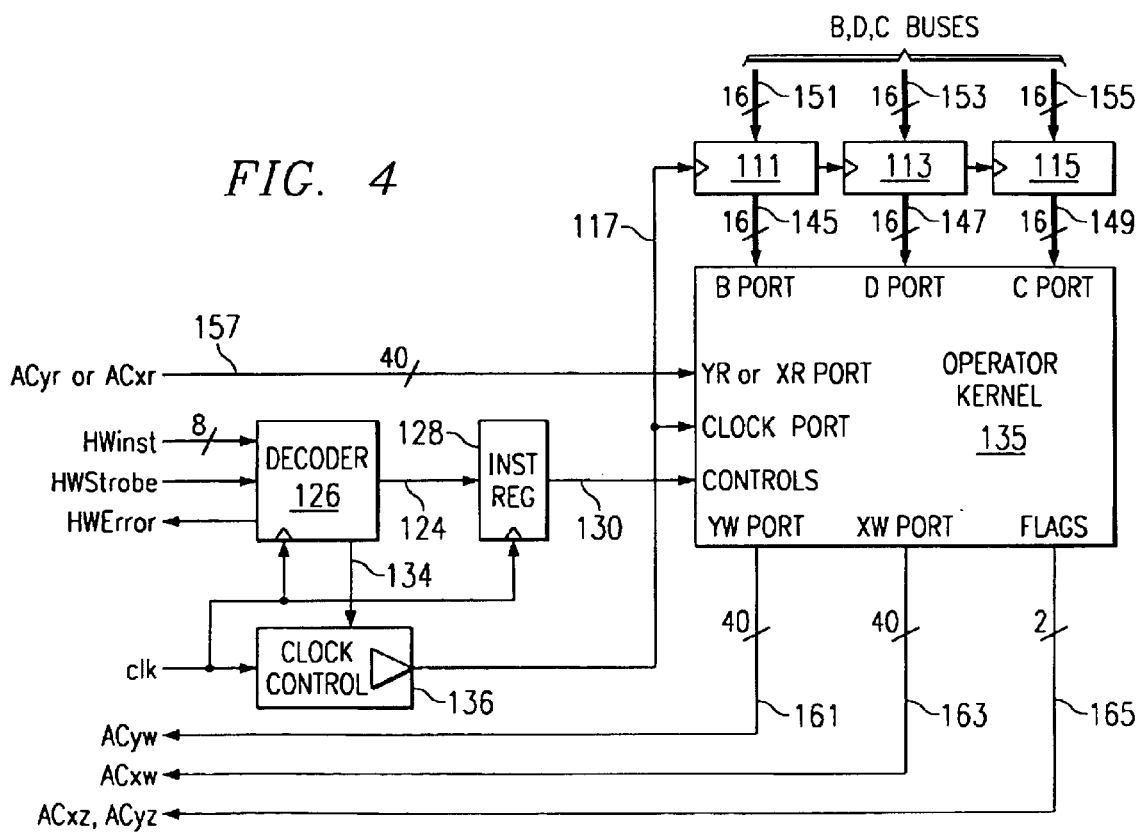
FIG. 4 is a block diagram of hardware accelerator 102, according to another embodiment of the invention in which the data flow mode are [Acx,ACy]=copr(ACy,Xmem, Ymem,Coef) or [Acx,ACy]=copr(Acx,Xmem,Ymem,Coef).

FIG. 4 is a block diagram of hardware accelerator 102, according to another embodiment of the invention in which the data flow mode are [Acx,ACy]=copr(ACy,Xmem,Ymem,Coef) or [Acx,ACy]=copr(Acx,Xmem,Ymem,Coef). Bus 124 couples decoder 126 to register 128. Bus 130 couples register 128 to operator kernel 135. A lead line 134 couples decoder 126 to clock control 136. A lead line 117 couples clock control 136 to register 111 and to the clock port of operator kernel 135. A bus 145 couples register 111 to the B port of operator kernel 135. A bus 147 couples register 113 to the D port of operator kernel 135. A bus 149 couples register 115 to the C port of operator kernel 135. Register 111 is coupled to bus 151 (B bus), register 113 is coupled to bus 153 (D bus), register 115 is coupled to bus 155 (C bus) and registers 111, 113 and 115 are also coupled to each other. One of an YR port or an XR port is coupled to bus 157 (ACyr in the case of YR port and ACxr in the case of XR port). The YW port of operator kernel 135 is coupled to bus 161 (ACyw). The XW port of operator kernel 135 is coupled to bus 163 (ACxw). The flags output of operator kernel 135 is coupled to bus 165 (ACxz, ACys). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 5:
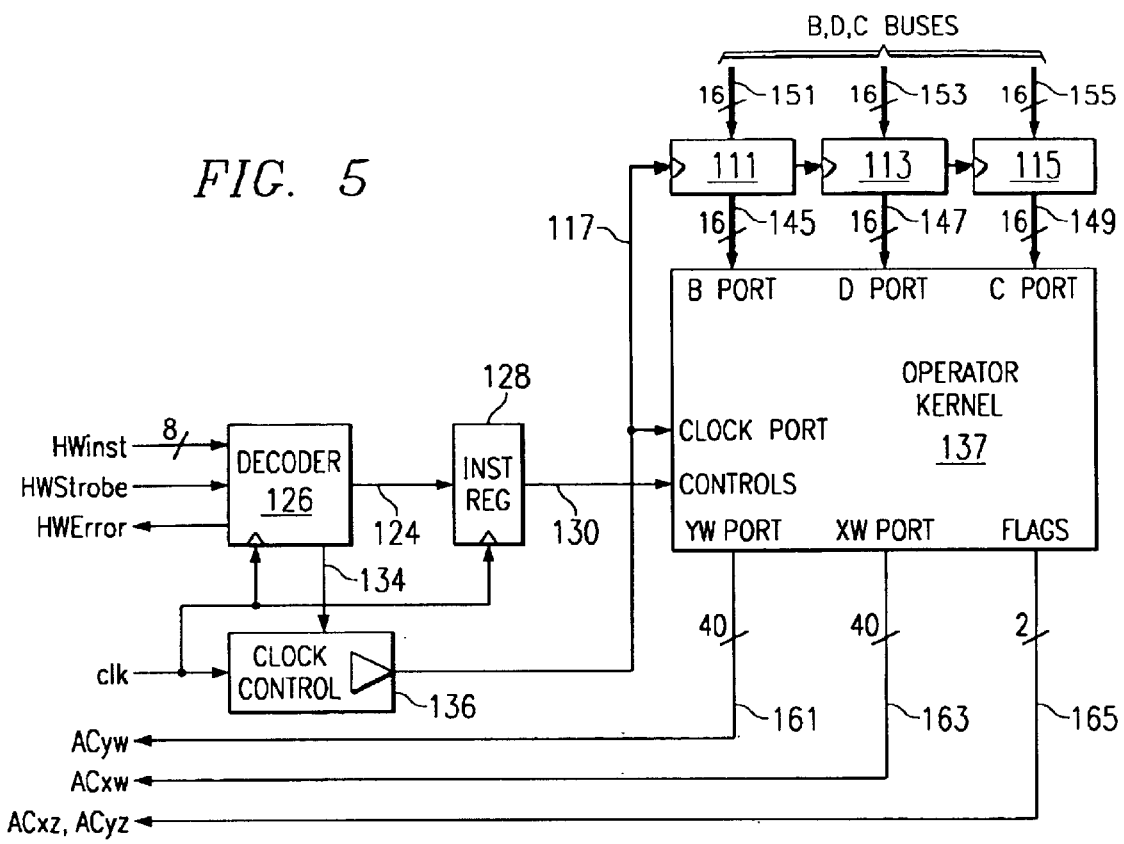
FIG. 5 is a block diagram of hardware accelerator 102, according to yet another embodiment of the invention in which the dataflow mode is [Acx,ACy]=copr(Xmem, Ymem,Coef).

FIG. 5 is a block diagram of hardware accelerator 102, according to yet another embodiment of the invention in which the dataflow mode is [Acx,ACy]=copr(Xmem,Ymem,Coef). Bus 124 couples decoder 126 to register 128. Bus 130 couples register 128 to operator kernel 137. A lead line 134 couples decoder 126 to clock control 136. A lead line 117 couples clock control 136 to register 139 and to the clock port of operator kernel 137. A bus 145 couples register 139 to the B port of operator kernel 135. A bus 147 couples register 141 to the D port of operator kernel 137. A bus 149 couples register 143 to the C port of operator kernel 135. Register 111 is coupled to bus 151 (B bus), register 113 is coupled to bus 153 (D bus), register 115 is coupled to bus 155 (C bus) and registers 111, 113 and 115 are also coupled to each other. One of a YR port or an XR port of operator kernel 137 is coupled to bus 157 (ACyr in the case of YR port and ACxr in the case of XR port). The YW port of operator kernel 137 is coupled to bus 161 (ACyw). The XW port of operator kernel 137 is coupled to bus 163 (ACxw). The flags output of operator kernel 137 is coupled to bus 165 (ACxz, ACys). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 6:
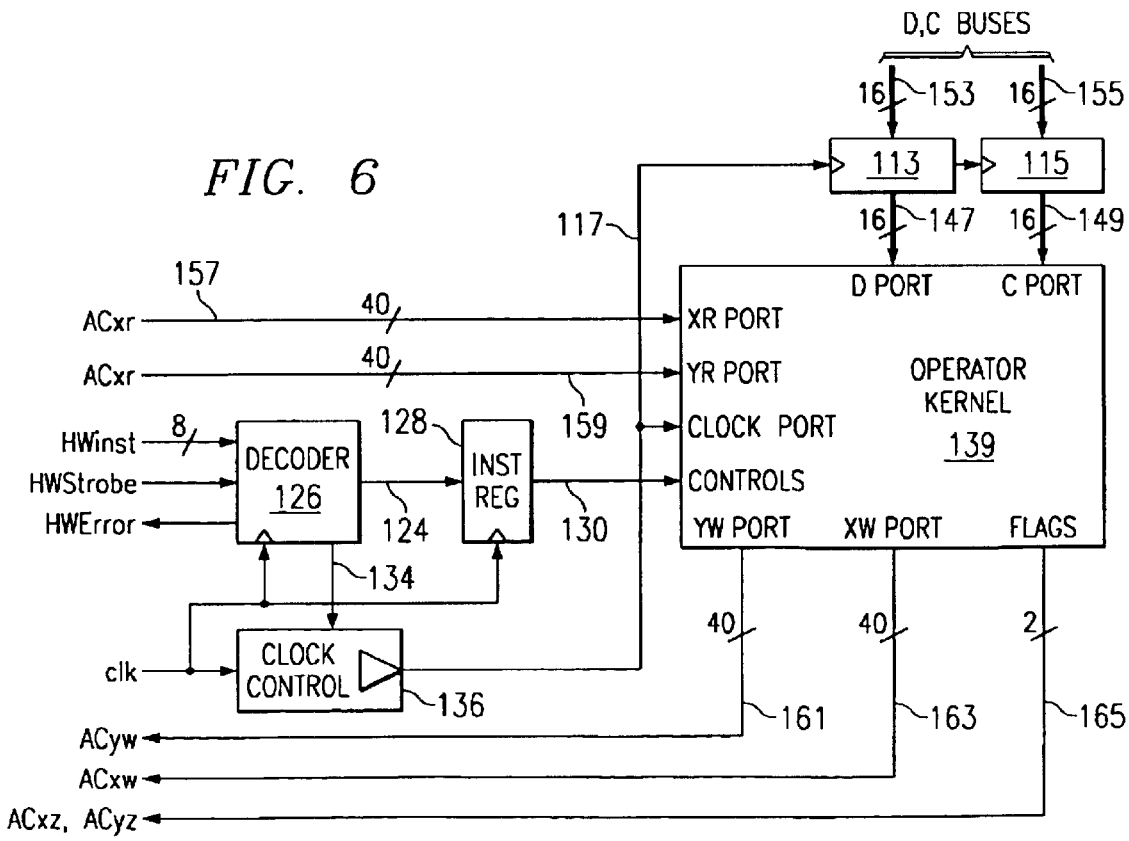
FIG. 6 is a block diagram of hardware accelerator 102, according to still yet another embodiment of the invention in which the dataflow mode is [Acx,ACy]=copr(Acx,ACy, Xmem,Ymem). Bus 124 couples decoder 126 to register 128.

FIG. 6 is a block diagram of hardware accelerator 102, according to still yet another embodiment of the invention in which the dataflow mode is [Acx,ACy]=copr(Acx,ACy,Xmem,Ymem). Bus 124 couples decoder 126 to register 128. Bus 130 couples register 128 to operator kernel 139. A lead line 134 couples decoder 126 to clock control 136. A lead line 117 couples clock control 136 to register 141 and to the clock port of operator kernel 139. A bus 147 couples register 141 to the D port of operator kernel 139. A bus 149 couples register 143 to the C port of operator kernel 139. Register 113 is coupled to bus 153 (D bus), register 115 is coupled to bus 155 (C bus) and registers 113 and 115 are also coupled to each other. The XR port of operator kernel 139 is coupled to bus 157 (ACxr). The YR port of bus operator kernel 139 is coupled to bus 159 (ACyr). The YW port of operator kernel 139 is coupled to bus 161 (ACyw). The XW port of operator kernel 139 is coupled to bus 163 (ACxw). The flags output of operator kernel 139 is coupled to bus 165 (ACxz, ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

FIG. 7 is a block diagram of hardware accelerator 102, according to another embodiment of the invention in which dataflow mode is ACy=copr(Acx,Xmem,Ymem) or ACy=copr(Acx,Lmem). Bus 124 couples decoder 126 to register 128. Bus 130 couples register 128 to operator kernel 141. A lead line 134 couples decoder 126 to clock control 136. A lead line 117 couples clock control 136 to register 113 and to the clock port of operator kernel 141. A bus 147 couples register 113 to the D port of operator kernel 141. A bus 149 couples register 115 to the C port of operator kernel 141. Register 113 is coupled to bus 153 (D bus), register 115 is coupled to bus 155 (C bus) and registers 113 and 115 are also coupled to each other. The XR port of operator kernel 141 is coupled to bus 157 (ACxr). The YW port of operator kernel 141 is coupled to bus 161 (ACyw). The flag output of operator kernel 141 is coupled to bus 165 (ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

FIG. 8 is a block diagram of hardware accelerator 102, according to yet another embodiment of the invention in which the dataflow mode is ACy=copr(Acx,Ymem,Coef). Bus 124 couples decoder 126 to register 128. Bus 130 couples register 128 to operator kernel 143. A lead line 134 couples decoder 126 to clock control 136. A lead line 117 couples clock control 136 to register 111 and to the clock port of operator kernel 143. A bus 145 couples register 111 to the B port of operator kernel 143. A bus 149 couples register 115 to the C port of operator kernel 143. Register 111 is coupled to bus 151 (B bus), register 115 is coupled to bus 155 (DC bus) and registers 111 and 115 are also coupled to each other. The XR port of operator kernel 141 is coupled to bus 157 (ACxr). The YW port of operator kernel 143 is coupled to bus 161 (ACyw). The flag output of operator kernel 143 is coupled to bus 165 (ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 9:
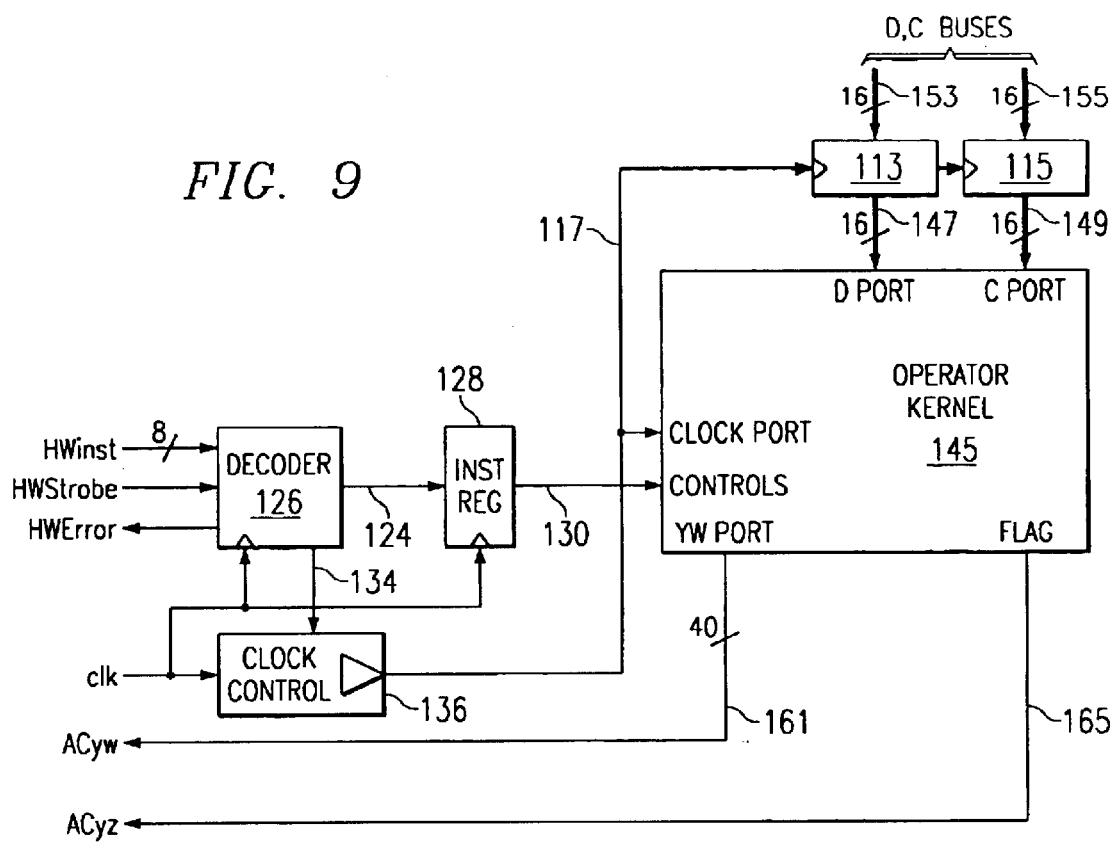
FIG. 9 is a block diagram of hardware accelerator 102, according to still yet another embodiment of the invention in which the dataflow mode is ACy=copr(Ymem,Coef).

FIG. 9 is a block diagram of hardware accelerator 102, according to still yet another embodiment of the invention in which the dataflow mode is ACy=copr(Ymem,Coef). Bus 124 couples decoder 126 to register 128. Bus 130 couples register 128 to operator kernel 145. A lead line 134 couples decoder 126 to clock control 136. A lead line 117 couples clock control 136 to register 113 and to the clock port of operator kernel 145. A bus 147 couples register 113 to the D port of operator kernel 145. A bus 149 couples register 115 to the C port of operator kernel 145. Register 113 is coupled to bus 153 (D bus), register 115 is coupled to bus 155 (C bus) and registers 113 and 115 are also coupled to each other. The YW port of operator kernel 145 is coupled to bus 161 (ACyw). The flag output of operator kernel 145 is coupled to bus 165 (ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 10:
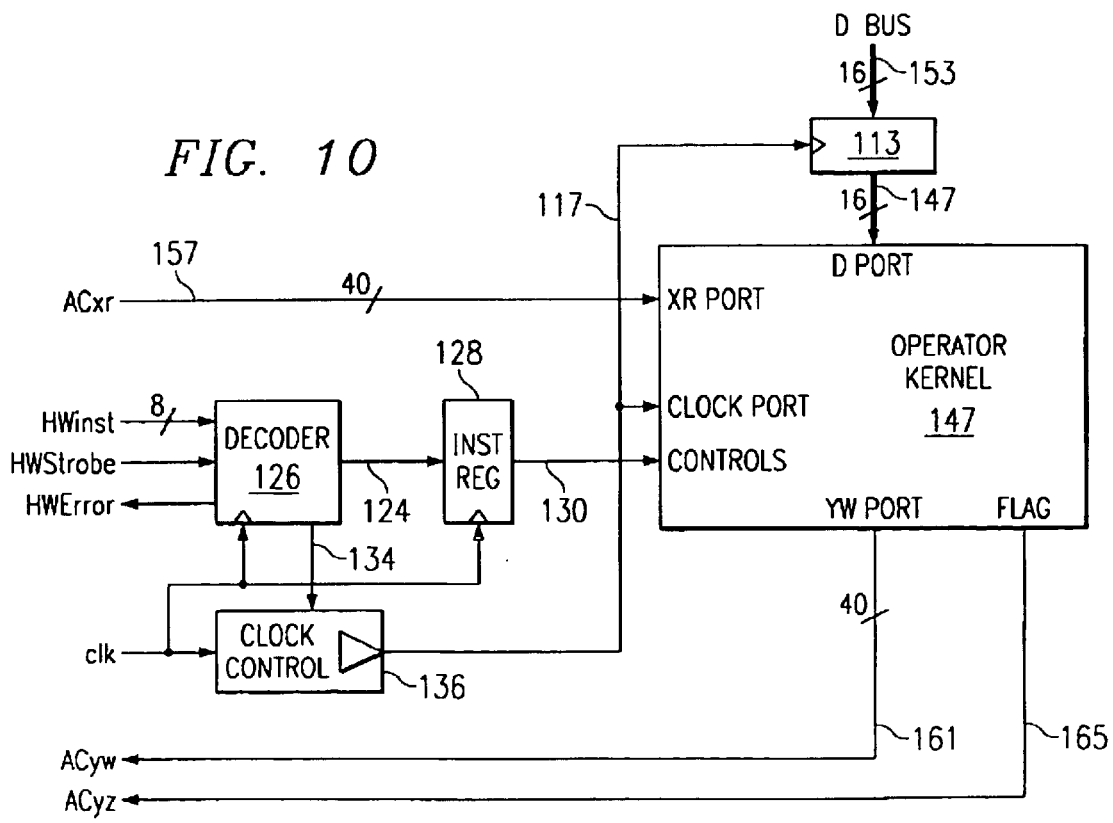
FIG. 10 is a block diagram of hardware accelerator 102, according to yet another embodiment of the invention in which the dataflow mode is ACy=copr(Acx,Smem).

FIG. 10 is a block diagram of hardware accelerator 102, according to yet another embodiment of the invention in which the dataflow mode is ACy=copr(Acx,Smem). Bus 124 couples decoder 126 to register 128. Bus 130 couples register 128 to operator kernel 147. A lead line 134 couples decoder 126 to clock control 136. A lead line 117 couples clock control 136 to register 113 and to the clock port of operator kernel 147. A bus 147 couples register 113 to the D port of operator kernel 147. Register 113 is also coupled to bus 153 (D bus). The port of operator kernel 147 is coupled to bus 157 (ACxr). The YW port of operator kernel 147 is coupled to bus 161 (ACyw). The flag output of operator kernel 147 is coupled to bus 165 (ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Figure 11:
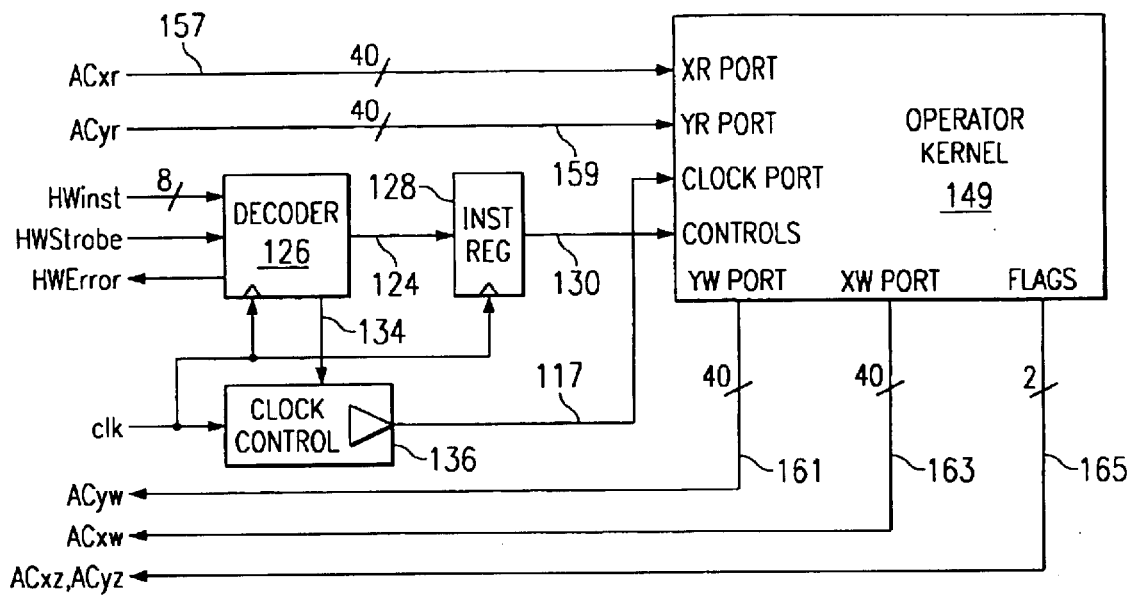
FIG. 11 is a block diagram of hardware accelerator 102, according to still yet another embodiment of the invention in which the dataflow mode is [Acx,ACy]=copr(Acx,ACy).

FIG. 11 is a block diagram of hardware accelerator 102, according to still yet another embodiment of the invention in which the dataflow mode is [Acx,ACy]=copr(Acx,ACy). Bus 124 couples decoder 126 to register 128. Bus 130 couples register 128 to operator kernel 149. A lead line 134 couples decoder 126 to clock control 136. A lead line 117 couples clock control 136 to the clock port of operator kernel 149. The XR port of operator kernel 149 is coupled to bus 157 (ACxr). The YR port of bus operator kernel 149 is coupled to bus 159 (ACyr). The YW port of operator kernel 149 is coupled to bus 161 (ACyw). The XW port of operator kernel 149 is coupled to bus 163 (ACxw). The flags output of operator kernel 149 is coupled to bus 165 (ACxz, ACyz). Decoder 126 is coupled to receive an "Hwinst" signal and an "HWStrobe" signal and coupled to output an "HWerror" signal. Decoder 126, register 128 and dock control 136 are all coupled to receive a clock signal.

Figure 12:
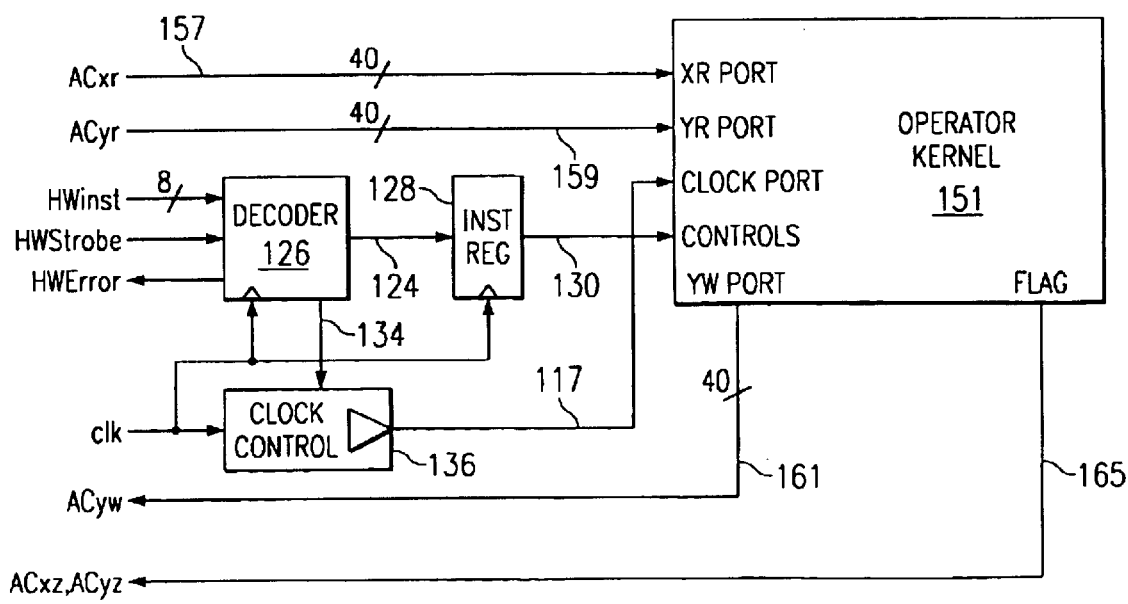
FIG. 12 is a block diagram of hardware accelerator 102, according to yet another embodiment of the invention in which the dataflow mode is ACy=copr(Acx,ACy).

FIG. 12 is a block diagram of hardware accelerator 102, according to yet another embodiment of the invention in which the dataflow mode is ACy=copr(Acx,ACy). Bus 124 couples decoder 126 to register 128. Bus 130 couples register 128 to operator kernel 151. A lead line 134 couples decoder 126 to clock control 136. A lead line 117 couples clock control 136 to the clock port of operator kernel 151. The XR port of operator kernel 151 is coupled to bus 157 (ACxr). The YR port of bus operator kernel 151 is coupled to bus 159 (ACyr). The YW port of operator kernel 151 is coupled to bus 161 (ACyw). The flag output of operator kernel 151 is coupled to bus 165 (ACxz, ACyz). Decoder 126 is coupled to receive an "Hwinst" signal and an "HWStrobe" signal and coupled to output an "HWerror" signal. Decoder 126, register 128 and clock control 136 are all coupled to receive a clock signal.

Moreover, any of the configurations of hardware accelerator 102 in drawing FIGS. 1–12 can also be mixed together to form a single hardware accelerator. No matter which hardware accelerator configuration is selected, a set of qualifiers in the instruction set of processor 12 (<<copr( )>>class) redefines the meaning of an instruction executing operations within the data processing unit (Dunit) of the DSP core. These instructions can include references that allow:

control for a dual access to data via two pointers, control for a third data value from another memory bank, control of more data sources from accumulators, control for destinations(s) of re-defined operation, the controls for the new operation.

The <<copr( )>> qualifiers class consists of 4 parallelisable opcodes which allow to pass the 8-bit instruction field to the hardware accelerator 102 in different ways and allow store operations to happen in parallel of the hardware accelerator execution. All properties and opcodes format are summarized in Table 2 below:

TABLE 2

| Opcode syntax | Format | Comments |
| --- | --- | --- |
| Copr(k6) | 16-bit | Merges "k6" field with some instruction fields to build hardware accelerator instruction. No write from ACs in parallel of HWA execution. |
| copr( ) | 8-bit | HWA instruction field is built from fields of the qualified instruction. No write from ACs in parallel of HWA execution. |
| Smem = Acx, copr( ) | 24-bit | Merges a 4-bit field from this qualifier to fields from the qualified instruction. Smem write from ACs allowed in parallel. |
| Lmem = Acx, copr( ) | 24-bit | Merges a 4-bit field from this qualifier to fields from the qualified instruction. Lmem write from ACs allowed in parallel. |

Combining above qualifiers with D Unit instructions creates a set of dataflows that can be used by the hardware accelerator 102. They are summarized in the table below, which gives the number of hardware accelerators available per dataflow and the cost in bytes of the qualified pair. For the sake of implementation of the hardware connection to the core when multiple accelerators are present in an application, the hardware accelerator 102 instruction field is divided in 2 parts:

bits 7–6 indicate the number of the hardware accelerator (up to 8 can be connected), bits 5–0 indicate the instruction code for the selected HWA (up to 32 instructions HWA).

When instruction fields exported to the hardware accelerator 102 cannot fill the upper 3 bits, then less than 8 hardware accelerators are available for such dataflow.

The dataflow mode describes the call to the hardware accelerator 102. The syntax used in below Table 3 utilizes the generic keyword "copr()" as a short form of the qualified instruction and qualifier opcode pair. The built-in parallelism syntax (ex: ACy=copr(ACx), Smem=ACz) is used for Smem or Lmem writes that are allowed in parallel of the execution in the hardware accelerator 102.

TABLE 3

| HWA dataflow Modes | Number of Accelerators Available | Number of Instructions/ Accelerators | Instruction size/(cost of qualifier) |
| --- | --- | --- | --- |
| ACy = copr(ACx, ACy) | 8 | 32 | 4(+2) |
| ACy = copr(ACx, ACy), Smem = Acz | 4 | 32 | 5(+1) |

TABLE 3-continued

| HWA dataflow Modes | Number of Accelerators Available | Number of Instructions/ Accelerators | Instruction size/(cost of qualifier) |
|---|---|---|---|
| ACy = copr(ACx, ACy), Lmem = Acz | 4 | 32 | 5(+0) |
| [ACx, Acy] = copr(ACx, ACy) | 8 | 32 | 5(+2) |
| [ACx, Acy] = copr(ACx, ACy), Smem = Acz | 8 | 32 | 6(+1) |
| [ACx, Acy] = copr(ACx, ACy), Lmem = Acz | 8 | 32 | 6(+0) |
| ACy = copr(Acx, Smem) | 8 | 32 | 5(+2) |
| ACy = copr(Acx, Smem), Smem = Acz | 2 | 32 | 6(+1) |
| ACy = copr(ACx, Lmem) | 8 | 32 | 5(+2) |
| ACy = copr(ACx, Lmem), Lmem = Acz | 2 | 32 | 6(+0) |
| ACy = copr(ACx, Xmem, Ymem) | 8 | 32 | 6(+2) |
|  | 2 | 32 | 5(+1) |
| [ACx, Acy] = copr(ACx, ACy, Xmem, Ymem) | 8 | 32 | 6(+2) |
| ACx = copr(Ymem, Coef), mar(Xmem) | 8 | 32 | 6(+2) |
| ACx = copr(ACx, Ymem, Coef), mar(Xmem) | 8 | 32 | 6(+2) |
| [ACx, Acy] = copr(Xmem, Ymem, Coef) | 8 | 32 | 6(+2) |
| [ACx, Acy] = copr(ACx, Xmem, Ymem, Coef) | 8 | 32 | 6(+2) |
| [ACx, Acy] = copr(ACx, Xmem, Ymem, Coef) | 8 | 32 | 6(+2) |
| [ACx, Acy] = copr(ACx, ACy, Xmem, Ymem, Coef) | 8 | 32 | 6(+2) |
|  | 3 | 32 | 5(+1) |

The control field of the hardware accelerator 102 may be extracted from dedicated locations of each qualified instruction. The concatenation of these bits creates a value which may be, itself, concatenated to bit fields coming from the qualifier, and which is used for external custom decoding. Tables 4–7 below describe the instruction formats and fields used to export this encoding (see Instruction Set User's guide for I-DSP #C55x for more information).

TABLE 4

| Qualified instruction By copr(k6) | Instruction format (e = bit exported) | Dataflow mode |
|---|---|---|
| Max_diff(ACx, Acy, ACz, ACw) | 0000 000E SSDD oooo SSDD xxxx 0000 000E SSDD oooo SSDD xxee HWA inst = [eek6] (00 to FF) | [Acx, Acy] = copr(ACx, ACy) |
| Sqdst(Xmem, Ymem, ACx, ACy) (1) Abdst(Xmem, Ymem, ACx, ACy) (2) | 0000 0000 XXXM MMYY YMMM DDDD ooox ppp% 0000 0000 XXXM MMYY YMMM DDDD ooox ppee HWA inst = [eek6] (1: 00 to 7F, 2: 80 to FF) | [Acx, ACy] = copr(ACx, ACy, Xmem, Ymem) |
| ACy = rnd(Smem*Acx) ([DR3 = Smem] is not validated) | 0000 0000 AAAA AAAI SSDD ooU% 0000 0000 AAAA AAAI SSDD ooee HWA inst = [eek6] (00 to FF) | ACy = copr(ACx, Smem) |

TABLE 5

| Qualified instruction By copr(k6) | Instruction format (e = bit exported) | Dataflow mode |
|---|---|---|
| ACy = ACx + dbl(Lmem) (1) ACy = ACx − dbl(Lmem) (2) | 0000 0000 AAAA AAAI SSDD ooox 0000 0000 AAAA AAAI SSDD ooee HWA inst = [eeK6] (1: 00 to 7F, 2: 80 to FF) | ACy = copr(ACx, Lmem) |
| ACy = M40 (rnd(ACx + uns (xmem)*uns (Ymem)))) ([DR3 = Smem] is not validated) | 0000 0000 XXXM MMYY YMMM SSDD ooog uuU% 0000 0000 XXXM MMYY YMMM SSDD ooog uuee HWA inst = [eek6] (00 to FF) | ACy = copr(ACx, Xmem, Ymem) |
| ACx = M40(rnd (uns(Xmem)*uns (coeff))), ACy = M40(rnd (uns(Ymem)*uns (coeff))) | 0000 0000 XXXM MMYY YMMM ooDD uuDD mmg% 0000 0000 XXXM MMYY YMMM ooDD uuDD mmee HWA inst = [eek6] (00 to FF) | [ACx, ACy] = copr(Xmem, Ymem, Coef) |
| ACx = M40(rnd (ACx + uns(Xmem)*uns (coeff))), ACy = M40(rnd (uns(Ymem)*uns (coeff))) | 0000 0000 XXXM MMYY YMMM ooDD uuDD mmg% 0000 0000 XXXM MMYY YMMM ooDD uuDD mmee HWA inst = [eek6] (00 to FF) | [ACx, ACy] = copr(ACx, Xmem, Ymem, Coef) |
| ACx = M40(rnd (ACx − uns (Xmem)*uns (coeff))), ACy = M40(rnd (uns(Ymem)*uns (coeff))) | 0000 0000 XXXM MMYY YMMM ooDD uuDD mmg% 0000 0000 XXXM MMYY YMMM ooDD uuDD mmee HWA inst = [eek6] (00 to FF) | [ACx, ACy] = copr(ACx, Xmem, Ymem, Coef) |
| Mar(Xmem), ACx = M40(rnd (uns(Ymem)*uns (coeff))) | 0000 0000 XXXM MMYY YMMM ooDD uuDD mmg% 0000 0000 XXXM MMYY YMMM ooDD uuDD mmee HWA inst = [EEK6] (00 to FF) | ACx = copr(Ymem, Coef), mar(Xmem) |
| ACx = M40(rnd (ACx + uns (Xmem)*uns (coeff))), ACy = M40(rnd (Acy + uns (Ymem)*uns (coeff))) | 0000 0000 XXXM MMYY YMMM ooDD uuDD mmg% 0000 0000 XXXM MMYY YMMM ooDD uuDD mmee HWA inst = [eek6] (00 to FF) | [ACx, ACy] = copr(ACy, Xmem, Ymem, Coef) |
| ACx = M40(rnd (ACx − uns (Xmem)*uns (coeff))), ACy = M40(rnd (ACy + uns (Ymem)*uns (coeff))) | 0000 0000 XXXM MMYY YMMM ooDD uuDD mmg% 0000 0000 XXXM MMYY YMMM ooDD uuDD mmee HWA inst = [eek6] (00 to FF) | [ACx, ACy] = copr(ACx, ACy, Xmem, Ymem, Coef) |
| ACx = M40(rnd ((ACx >> #16) + uns(Xmem)*uns (coeff))), ACy = M40(rnd (ACy + uns (Ymem)*uns (coeff))) | 0000 0000 XXXM MMYY YMMM ooDD uuDD mmg% 0000 0000 XXXM MMYY YMMM ooDD uuDD mmee HWA inst = [eek6] (00 to FF) | [ACx, ACy] = copr(ACx, ACy, Xmem, Ymem, Coef) |
| Mar(Xmem), ACx = M40(rnd (ACx + uns (Ymem)*uns (coeff))) | 0000 0000 XXXM MMYY YMMM ooDD uuDD mmg% 0000 0000 XXXM MMYY YMMM ooDD | ACx = copr(ACx, Ymem, Coef), mar(Xmem) |

TABLE 5-continued

| Qualified instruction By copr(k6) | Instruction format (e = bit exported) | Dataflow mode |
|---|---|---|
| | uuDD mmee HWA inst = [eek6] (00 TO FF) | |
| ACx = M40(rnd (uns(Xmem)*uns (coeff))), ACy = M40(rnd ((ACy >> #16) + uns(Ymem)*uns (coeff))) | OOOO OOOO XXXM MMYY YMMM ooDD uuDD mmg% OOOO OOOO XXXM MMYY YMMM ooDD uuDD mmee HWA inst = [eek6] (00 to FF) | [ACx, ACy] = copr(ACx, ACy, Xmem, Ymem, Coef) |
| ACx = M40(rnd ((ACx >> #16) + uns (Xmem)*uns (coeff))), ((ACy ACy = M40(rnd >> #16) + uns (Ymem)*uns (coeff))) | OOOO OOOO XXXM MMYY YMMM ooDD uuDD mmg% OOOO OOOO XXXM MMYY YMMM ooDD uuDD mmee HWA inst = [eek6] (00 to FF) | [Acx, ACy] = copr(ACx, ACy, Xmem, Ymem, Coef) |
| ACx = M40(rnd (ACx − uns (Xmem)*uns (coeff))), ACy = M40(rnd ((ACy >> #16) + uns (Ymem)*uns (coeff))) | OOOO OOOO XXXM MMYY YMMM ooDD uuDD mmg% OOOO OOOO XXXM MMYY YMMM ooDD uuDD mmee HWA inst = [eek6] (00 to FF) | [ACx, ACy]= copr(ACx, ACy, Xmem, Ymem, Coef) |
| Mar(Xmem), ACx = M40(rnd ((ACx >> #16) + uns(Ymem)*uns (coeff))) | OOOO OOOO XXXM MMYY YMMM ooDD uuDD mmg% OOOO OOOO XXXM MMYY YMMM ooDD uuDD mmee HWA inst = [eek6] (00 to FF) | ACx = copr(ACx, Ymem, Coef), mar(Xmem) |
| ACx = M40(rnd (ACx − uns (Xmem)*uns (coeff))), ACy = M40(rnd (ACy − uns (Ymem)*uns (coeff))) | OOOO OOOO XXXM MMYY YMMM ooDD uuDD mmg% OOOO OOOO XXXM MMYY YMMM ooDD uuDD mmee HWA inst = [eek6] (00 to FF) | [ACx, AXy] = copr(ACx, ACy, Xmem, Ymem, Coef) |
| Mar(Xmem), ACx = M40(rnd (ACx + uns (Ymem)*uns (coeff))) | OOOO OOOO XXXM MMYY YMMM ooDD uuDD mmg% OOOO OOOO XXXM MMYY YMMM ooDD uuDD mmee HWA inst = [eek6] (00 to FF) | ACx = copr(ACx, Ymem, Coef), mar(Xmem) |

Table 6 describes the "copr( )" qualifier:

TABLE 6

| Qualified instruction By copr( ) | Instruction format (e/w = bit exported/encoded) | Dataflow mode |
|---|---|---|
| ACx = M40(rnd(ACx + uns(Xmem)*uns(coeff))), ACy = M40(rnd(ACy + uns(Ymem)*uns(coeff))) (1) ACx = M40(rnd(ACx − uns(Xmem)*uns(coeff))), ACy = M40(rnd(ACy + uns(Ymem)*uns(coeff))) (2) ACx = M40(rnd(ACx >> #16) + uns(Xmem)*uns(coeff))), | OOOO OOOO XXXM MMYY YMMM ooDD uuDD mmg% OOOO OOww XXXM MMYY YMMM wwDD eeDD mmee HWA inst = [wwwweeee] (1: 00 to 0F, 2: 10 to 1F, | [ACx, ACy] = copr(ACx, ACy, Xmem, Ymem, Coef) |
| ACy = M40(rnd(ACy + uns(Ymem)*uns(coeff))) (3) ACx = M40(rnd(ACx >> #16) + uns(Xmem)*uns(coeff))), ACy = M40(rnd(ACy >> #16) + uns(Ymem)*uns(coeff))) (4) ACx = M40(rnd(ACx − uns(Xmem)*uns(coeff))), ACy = M40(rnd((ACy >> #16) + uns(Ymem)*uns(coeff))) (5) ACx = M40(rnd(ACx − uns(Xmem)*uns(coeff))), ACy = M40(rnd(ACy − uns(Ymem)*uns(coeff))) (6) | 3: 20 to 2F, 4: 30 to 3F, 5: 40 to 4F, 6: 50 to 5F) | |
| ACy = M40(rnd(ACx + uns(Xmem)*uns(Ymem)))) ([DR3 = Smem] is not validated) (1) ACy = M40(rnd(ACx >> #16) + uns(Xmem)*uns(Ymem)))) ([DR3 = Smem] is not validated) (2) | OOOO OOOO XXXM MMYY YMMM SSDD ooog uuU% OOOO OOOO XXXM MMYY YMMM SSDD oeoe eeee HWA inst = [00eeeeee] (1: 00 to 1F, 2: 20 to 3F) | ACu = copr)ACx, Xmem, Ymem) |

This is the table for "S(L)mem=ACx, copr( )" qualifiers (cccc field is coming from these qualifiers):

TABLE 7

| Qualified instruction By S(L)mem = ACx, copr( ) | Instruction format (e/w = bit exported/encoded) | Dataflow mode |
|---|---|---|
| ACy = rnd(ACx*ACx) (1) ACy = saturate(rnd(ACx)) (2) ACy = rnd(ACx) (3) | OOOO OOOE SSDD ooo% OOOO OOOE SSDD wwwe HWA inst = [wwwecccc] (1: 00 to 1F, 2: 20 to 3F, 3: 40 to 5F) | ACy = copr(ACx), Smem = Acz ACy = copr (ACx), Lmem = Acz |
| ACy = rnd(ACy*ACx) (1) ACy = rnd(ACy + ACx*ACx) (2) ACy = rnd(ACy − ACx*ACx) (3) ACy = rnd(ACy + |ACx|) (4) | OOOO OOOE SSDD ooo% OOOO OOOE SSDD wwwe HWA inst = [wwwecccc] (1: 00 to 1F, 2: 20 to 3F, 3: 40 to 5F, 4: 60 to 7F) | ACy = copr(ACx, ACy), Smem = Acz ACy = copr(Acx, ACy), Lmem = Acz |
| Max_diff(ACx, ACy, ACz, Acw) | OOOO OOOE SSDD oooo SSDD xxxx OOOO OOOE SSDD oooo SSDD eeee HWA inst = [eeeecccc] (00 to FF) | [ACx, ACy] = copr(ACx, ACy), Smem = Acz [ACx, Acy] = copr(ACx, (Acy, Lmem = ACz) |
| ACy = rnd(Smem*Acx) ([DR3 = Smem] is not validated) | OOOO OOOO AAAA AAAI SSDD ooU% OOOO OOOO AAAA AAAI SSDD ooee HWA inst = [00eecccc] (00 to 3F) | ACy = copr(ACx, Smem), Smem = Acz |
| ACy = ACx + dbl(Lmem) (1) ACy = ACx − dbl(Lmem) (2) | OOOO OOOO AAAA AAAI SSDD ooox OOOO OOOO AAAA AAAI SSDD ooee | ACy = copr(ACx, Lmem), Lmem = Acz |

TABLE 7-continued

| Qualified instruction<br>By S(L)mem = ACx, copr( ) | Instruction format<br>(e/w = bit<br>exported/encoded) | Dataflow<br>mode |
|---|---|---|
| | HWA inst =<br>[00eecocc]<br>(1: 00 to 1F, 2: 20 to 3F) | |

Some default decoding rules are also defined:

1) Any other instruction pair built with the "copr( )" class that is not in the tables above is rejected by the hardware and a "nop" is executed, instead.

2) Status bit update flow coming with the standalone D Unit instruction is disabled when this instruction is qualified by the "copr( )" class. The only exception to this rule is for zero flags. Update of these bits in destination accumulators is allowed from the hardware accelerator and they receive the content carried by the zero flags signals computed by the hardware accelerator.

3) Other fields than those used to build the HWA instruction are processed as defined on the standalone instruction. If some of the "e" or "w" fields above overlap with opcode fields, then these opcodes will be also used as for normal instruction process in the machine pipeline.

Figure 13:
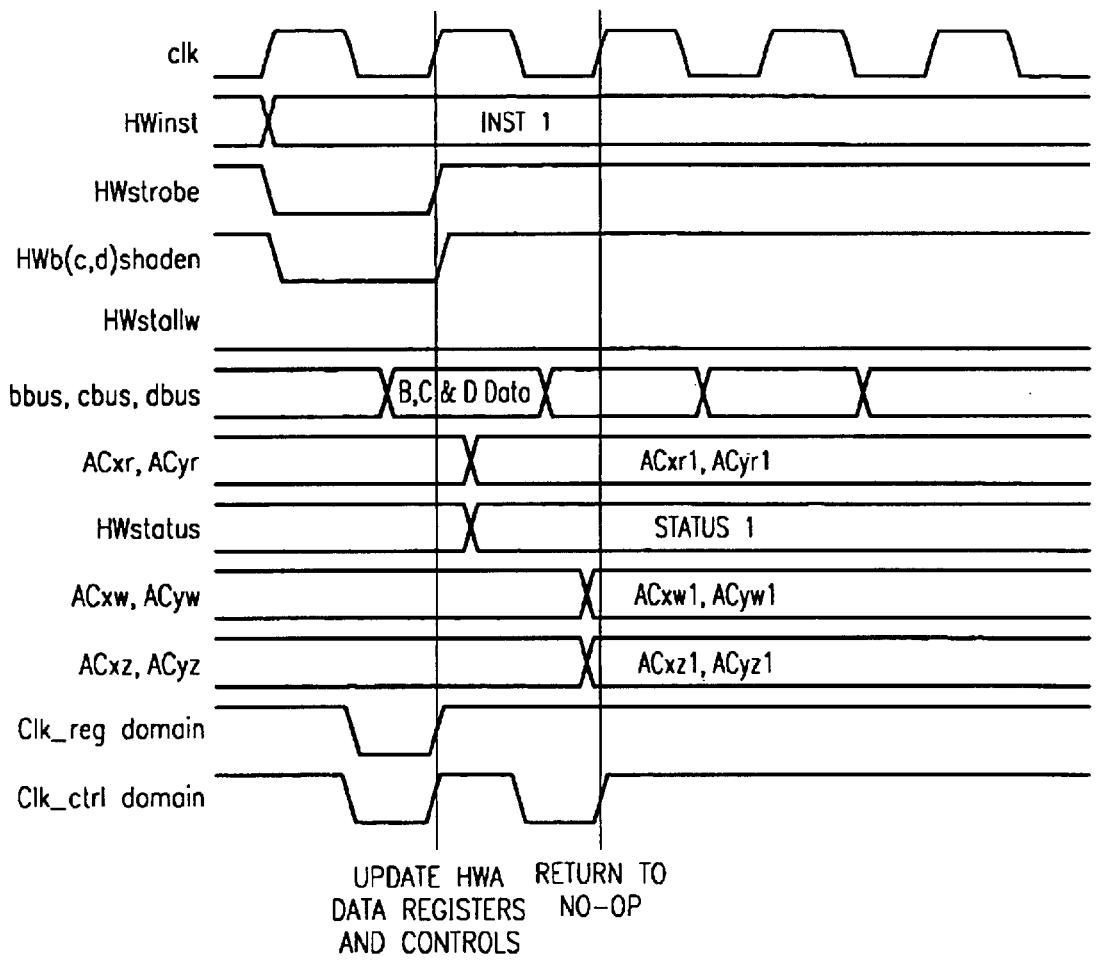
FIG. 13 is a timing diagram for a single cycle operation.

A timing diagram for a single-cycle operation is shown in FIG. 13. Input capacitance, output drive strength, delays from clock to outputs and slopes, input setup and hold time are characterized as part of the CPU timing extractions. Moreover, being that this invention anticipates that more than one hardware accelerator can be connected to this bus scheme, ACx[w,z] and ACy[w, z] can be tri-state signals. The Hardware accelerator that recognizes its instruction field will drive the bus at the end of the clock cycle.

Software View of the Hardware Accelerator:

In order to co-design software to use the hardware accelerator and its functional reference, the C model of processor 12 (TI-DSP # C55x) will provide templates and hooks to plug a view of the hardware. This will be performed by a function call associated with controls of "copr( )" and instruction dispatch decoding which operates in the Execute phase of the model pipeline. The function template will contain parameters definition and types. A user will have to provide the C code corresponding to hardware accelerator behavior. By default, when no accelerator is connected to the interface, the function returns 0 results on accumulator buses and corresponding zero flag is set to '1'.

In terms of software development, "copr( )" qualification can be supported by MACRO statements. Below is an example of such an approach:

```
MOTION_EST1 .macro
    AC0 = (*AR0+%) * (*CDP+%), AC1 = (*AR1+%Z) *
(*CDP+%) || copr( )
    .edm
MOTION_EST1 .macro
    AC2 = sat((*AR0+%) * (*CDP+%)), AC1 = sat((*AR1+%) *
(*CDP+%) || copr( )
    .endm
    local repeat
    {
        CDP = AR1
        || repeat #16
            MOTION_EST1
```

-continued

```
        CDP = AR2
        || repeat #16
            MOTION_EST2
        mar(AR0+DR0) || mar(AR2+DR1)
        mar(AR1+DR0)
    }
```

Hardware View of the Hardware Accelerator:

The hardware accelerator appears in VHDL models of the CPU (functional and timing models). All the signals are characterized with respect to the "clk" clock, according to table below:

TABLE 8

| bbus, cbus, dbus | Intrinsic delay/drive | clk rising |
|---|---|---|
| ACxr, Acyr | Intrinsic delay/drive | clk rising |
| ACxz, Acyz | setup/hold times | clk rising |
| A Cxw, Acyw | setup/hold times | clk rising |
| HWStatus | intrinsic delay/drive | clk rising |
| Hwinst | intrinsic delay/drive | clk rising |
| Hwstrobe | intrinsic delay/ drive | clk rising |
| Hwbshaden | intrinsic delay/ drive | clk rising |
| Hwcshaden | intrinsic delay/ drive | clk rising |
| Hwdshaden | intrinsic delay/drive | clk rising |
| Hwstallw | intrinsic delay/drive | clk falling |
| Hwerror | setup/hold times | clk rising |

An example of how usage of the hardware accelerator coupling scheme and of how software versus hardware trade-offs can be implemented is disclosed below, in video application field. Most of the cycle count in motion estimation comes from a Full Search (FS) task which consists of computing the distortions obtained by comparing a macroblock to a certain area of pixel in the reference image and repeating this operation for all macroblocks in the image from which motion has to be estimated. For a H.261 function, the window around the macroblock extends by +/− 15 pixels. For a single macroblock, computations consist of 256 distortions each built from 256 sums of absolute differences between a macroblock pixel and a reference window pixel. Pixels are coded on 8 bits (luminance) and distortions are coded on 16 bits.

Figure 14:
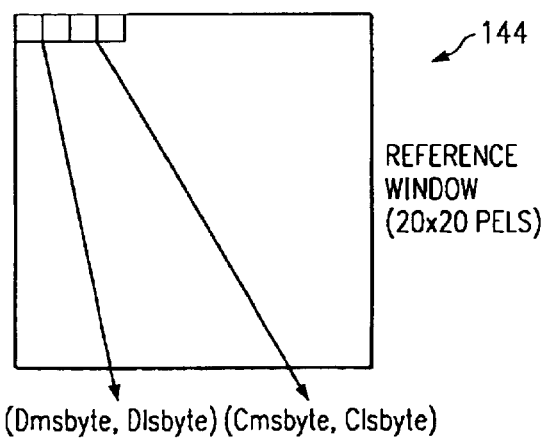
FIG. 14 illustrates a reference widow with 20×20 pixels.
Figure 15:
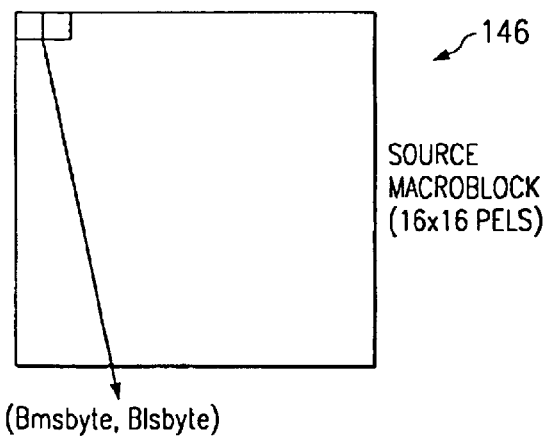
FIG. 15 illustrates a source macroblock with 16×16 pixels.
Figure 16:
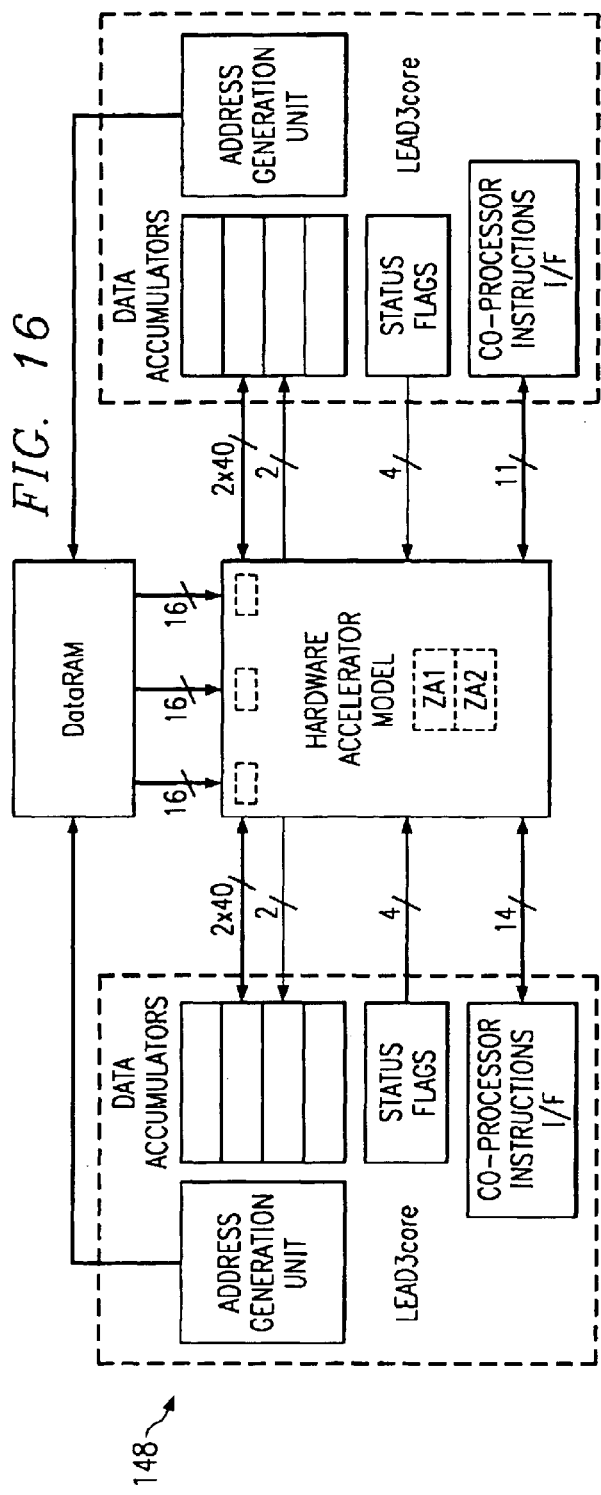
FIG. 16 is a block diagram of a data processing system according to another embodiment of the invention.

One way to decrease pure computation bandwidth at the image level is to apply a Hierarchical Full Search (HFS). This comprises generating, from the first image, sub-images derived by filtering in order to downsample by 2 on both directions the sub-image from the previous one. With 4 levels of sub-images, Full Search methods can be applied on a window which extends only by +/− two pixels around the macroblock (only 25 distortions are needed). This is the implementation chosen for the example. The hardware accelerator 102 will implement the basic computations to obtain the distortions. These will be stored in the accumulators (up to 4×2=8 distortions can fit). The search window is stored in a dual access memory bank. The macroblock of the reference image is stored in a Single access memory bank. Using the type 1 instructions re-defined by the copr( ) qualifier, it is possible to fetch, at each cycle, 2 pixels from the reference macroblock and 4 pixels from the search window. Thus, 3 distortions can be processed in parallel:

FIG. 14 illustrates a search window with 20×20 pixels, generally at 144. FIG. 15 illustrates a source macroblock with 16×16 pixels, generally at 146.

Operation Mode:

ACxwmsbyte=abs(Dmsbyte−Bmsbyte)+abs(Dlsbyte−Blsbyte)+ACxmsbyte;

ACxy=zero(ACxw), ACxs=0

ACxwlsbyte=abs(Dlsbyte−Bmsbyte)+abs(Cmsbyte−Blsbyte)+ACexrlsbyte
ACywmsbyte=abs(Cmsbyte−Bmsbyte)=abs(Clsbyte−Blsbyte)+ACxrmsbyte;
ACyz=zero(Acyw), ACys=0
ACywlsbyte=ACyrlsbyte Distortions are stored on upper and lower parts of the accumulators. As an example, if hardware instructions 00 and 01 are selected for mode selection, the main loop to manage this extension is given below.

Initializations:
AR0=(base address for reference window)
AR2=(base address for macroblock)
AR3=(base address for distortion storage)
DR0=#20
DR1=#16
BRC0=#5
BRC1=#16
AR1=AR0+1
BK0=#20
BKC=#16
AC0=#0
AC1=#0
AC2=#0

Main loop for computation of the table of 5×5 distortions
  Repeat
  {
Processing of the contribution of the macroblock to a line of 5 distortions (this code fits in the DSP Instruction Buffer):

```
Local repeat
{
    CDP = AR2
    || repeat #16
        AC0 = (*AR0+%)*(*CDP+%)), AC1 =
(*AR1+%)*(*CDP+%) || copr( )
    CDP = AR2
    || repeat #16
        AC2 = sat((*AR0+%) * (*CDP+%)), AC1 =
sat((*AR1+%)*(*CDP+%)) || copr( )
        mar(AR0+DR0)) || mar(AR2+DR1)
        mar(AR1+DR0)
}
```

Storage of distortions (and preparation of next iterations):

```
dbl(*AR3+) = AC0 || DR0 = DR0 + #20
*AR3+ = LO(AC1) || AR0 = (base address for reference window)
dbl(*AR3+) = AC2 || AR1 = AR0 + DR0
AR2 = (bas address for macroblock) || mar(AR0+DR0)
AC0 = #0 || mar(AR1+)
AC1 = #0
AC2 = #0
}
```

If the main loop does not fit in the DSP core instruction buffer, first iteration inside will be executed with a cycle penalty on redefined instructions. As a result, execution time of the loop above can be evaluated as: 2775 cycles. The total number of Mean Absolute Error computations (sub followed by abs( ) and then by add) are 25×16×16=6400, which means 2.3 computations per cycle.

Thus, an advantage of the invention is that all of the basic mechanisms are within the hardware accelerator 102, the RAM 104 and the DSP core 18. The hardware accelerator receives data in the same way as other operators in the DSP because it is seen as a DSP resource by the instruction set. It can receive up to three values from memory per cycle. It knows about the internal resources through two read and two write buses to get two of the accumulator contents. It doesn't have to know about transfer of data from one part of the system to another. The hardware accelerator controls are exported from the DSP instruction to the edge of the processor. There is a strobe signal which is 1 bit (Hwstrobe), a micro-instruction which is 8-bits (Hwinst), a set of stalls indicators in the DSP pipeline (Hwstall) for optional control of internal state machines of the accelerator that should be maintained in sync with the pipeline activity and a bus error flag that is returned to the processor and merged into its bus error management (Hwerror). Decoding of the micro-instruction word can be done so that upper 3 bits identify a given hardware accelerator and the 5 lower bits define 32 instructions per accelerator. By using these three bits to select a hardware accelerator, a user can manage the connection to the accumulators write buses (through either tri-state or mux-based implementation).

In addition the invention exports a set of status lines coming out of the DSP such as rounding mode, so that it can be aware of the arithmetic modes that are used by the DSP and the hardware accelerator model is sending back "zero result flags" associated with the 2 40-bit results.

The hardware accelerator, as disclosed, is physically separate from the DSP core. A user of the invention should be able to connect the hardware accelerator and a DSP together, from a software point of view, and use the hardware accelerator as if it were part of the instruction set. The invention discloses some classes of instructions—and contemplates other classes—but from a software standpoint, a user can put the control of these in software loops. It could connect this model to the software simulator to debug its software. Then, a user could move the hardware accelerator functional view to VHDL in order to generate the gate level view. As a result, the impact of this is in several steps in the design flow—application level and design level. For design level a user will also need timing information for the performance information of the pins, etc.

In any embodiment of the invention, a user can always prototype the content of the hardware accelerator by using some of the standard DSP features in the loop. As an example, all the functionality can be implemented in the ALU. When moving to the Hardware accelerator, the "software" version will be accelerated by a factor between 4 and 20, depending on the application. The level of acceleration is part of the compromise between hardware complexity added in the accelerator and software.

Another novel aspect of the invention is in the data flow. The instruction interface is used to facilitate the export of behavior such as, "multiply three eight bit values all together to generate something, and return that through this bus to the accumulators". An instruction and a bit field are exported to controller, but sources and destinations are not exported. The current invention provides access to all of the internal resources of the DSP which are exported to the accelerator for on the fly usage and a value is returned back. The value is stored within the core when the execution is done. As a result, the invention does not have to use the MCR mode of the prior art which would move the values that would be computed in the hardware accelerator back to the internal core through this bus. In contrast to the present invention, the prior art does not export sources and destinations.

As a result, the invention facilitates a single cycle operation that uses three reads of memory plus two accumulator reads and returns back to the accumulators in the same cycle. There is no transfer—the transfer is built within the copying. The same is repeated when data RAM 104 is utilized. In the prior art, in contrast, to do processing from the buffer in the RAM requires that the ARM install the buffer first after which it performs control operations and processing through the RAM and thereafter move the results back to the DSP. The present invention allows all of this to be done in one instruction.

If the DSP ultimately selected is not of the TI-DSP #C55x family, or if the functionality of the class of instructions in the DSP (TI-DSP #C55x) are not used then, alternatively, the invention contemplates use of a processor "copr" instruction, which can be generated in the processor's instruction table which can be put in parallel with any instruction which extracts from some instructions, fields of the instructions. As an example, there is an op code field and some reference to memory access (op-code field is all the zeros on page—as previously disclosed). The result is a reference to memory dual memory (xxxmmmyyy) along with (MMM) code which is the third access. On top of this, there are source and destination of accumulators (ooDD & uuDD) and all the remaining fields which define (in a dual-MAC for example) the op-codes controlling the processing function. Four times two bits would be exported at this interface boundary, defining the eight bits to control the hardware accelerator.

Also, according to the invention, a decoder of the hardware accelerator manages the instruction field and the strobe. From these the hardware accelerator can generate necessary clocks and thus reduce power consumption when the accelerator is not used.

In summary, the hardware acceleration concept of the embodiments describe above has two parts: 1) the hardware part, which is the interface, and its capabilities, and 2) the instruction set part which is used to control the interface and the different mode and the sharing. The invention allows various types of tradeoffs between software and hardware because much of the functionality is performed within the machine pipeline.

While the present invention has been disclosed in a single processor system, providing multiple operation in both single and multi-cycle operation, the invention also contemplates other embodiments. As an example, the hardware accelerator can be used to connect two DSPs (TI C55xs in this case—as shown generally at 148 in FIG. 16) cores together, because what can be done in a single core embodiment can also be used in a multi-core embodiment to synchronize the transfer of internal resources of one core to the other, using the hardware accelerator protocol. Thus, it may be desirable to have two cores and a hardware accelerator on the same chip when there is a need to exchange some of the computation, via daisy chaining—similar to what can be done in SIMD machines where operators exchange values—especially if they share the same program or execute the same type of program.

Figure 17:
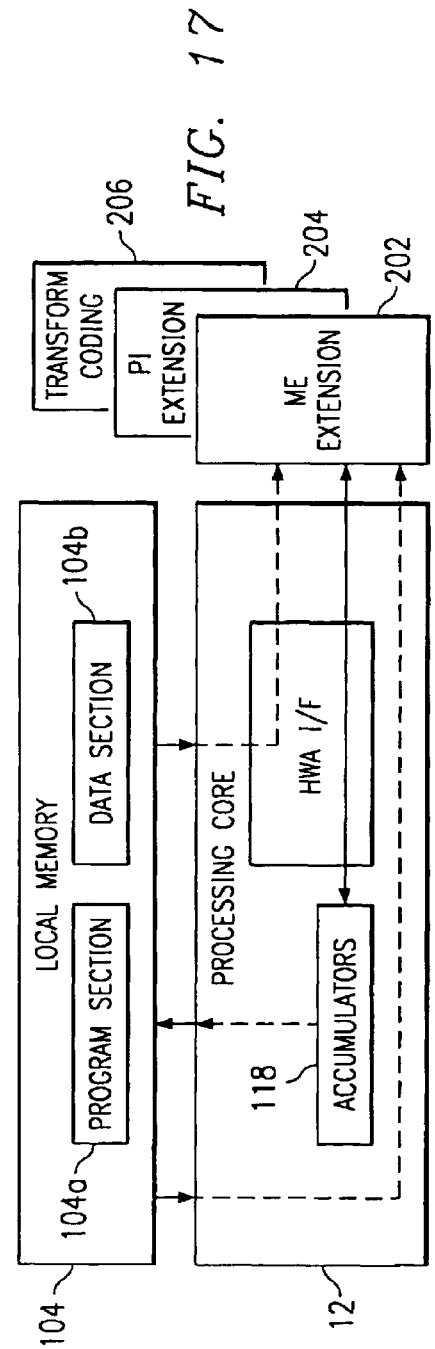
FIG. 17 illustrates a block diagram of a processing device using hardware extension to improve video and image processing.

FIG. 17 illustrates a block diagram of a processing device using hardware extensions to improve video and image processing. Specifically, the processing device 200 includes a processing core 12 coupled to a local memory 104 and three hardware extensions 102. Specifically, processing core 12 is coupled to ME (motion estimation) extension 202, transform coding extension 204, and PI (pixel interpolation) extension 206. Local memory 104 includes a program section 104*a* and a data section 104*b* coupled to the extensions 102, as are the accumulators 118 of the processing core 12.

In operation, the hardware extensions perform functions that are used in a great deal of video and image codec applications. Motion estimation calculations (also known as "block matching") can be the most time consuming, and processor cycle consuming, part of an encoding process. Specifically, the ME extension 202 performs a calculation that compares reference blocks of pixels in a current frame with nearby blocks of pixels in a preceding frame. The motion estimation calculations are used to find a closely matching block. If a matching block is found, it can be used as a substitute for the reference block in the current frame. Typically, motion estimation is performed only on the luminance component of the frames.

The quality of the motion estimation can be enhanced through the use of pixel interpolation in the search area, which effectively increases the resolution within the search area.

A mean absolute difference (MAD) function is widely used to determine the degree of matching between a reference block and a candidate block. For purposes of illustration, it is assumed that the motion estimation extension 202 performs a MAD function; however, other functions known in the art, such as a mean square difference (MSD), Pel difference calculation (PDC), or integral projection (IP) function could be implemented by the motion estimation extension 202, either in substitution with the MAD function or in addition to the MAD function.

The transform coding functions are used to separate an image into sub-parts of varying importance. In the preferred embodiment, a DCT (direct cosine transform) is used as the transform coding function. Each sub-part is assigned a value used to reduce the storage space for overall image or frame. IDCT (inverse direct cosine transform) functions are used to reverse the DCT function and reconstruct the image from compressed data. While the invention is discussed in relation to the DCT function in the transform coding extension 206, other techniques, such as DST (Direct sine transform) or KLT (Karhunen-Loeve transform) could be used to implement the transform coding extension. For efficiency, a recursive transform coding function, such as DCT/iDCT is preferred.

PI functions are used to generate additional, intermediate pixels between actual pixels in an image. These pixels can be used to generate a higher resolution picture, or, as stated above, to improve the motion estimation function.

Figure 18:
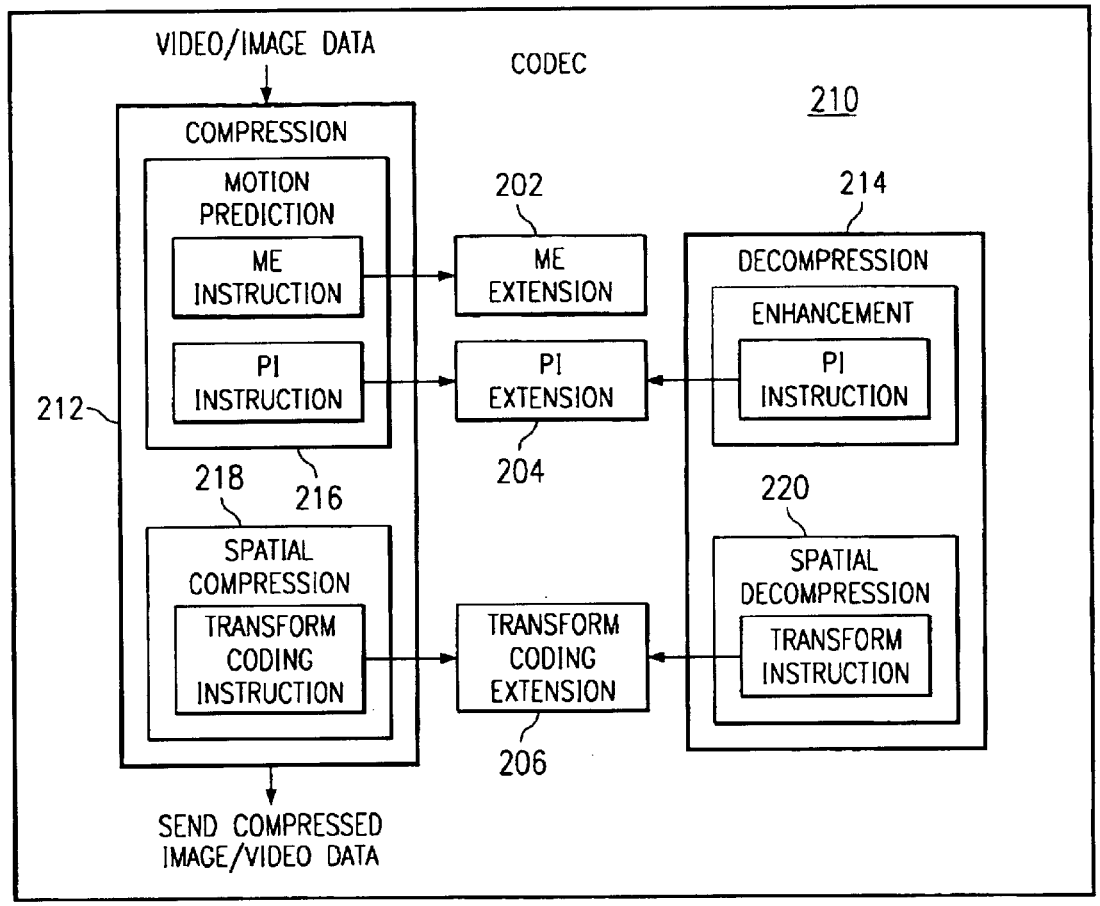
FIG. 18 illustrates a codec (compressor/decompressor) application that could be performed by the processing device using the hardware extensions of FIG. 17.

FIG. 18 illustrates an codec application 210 that could be performed by the processing device 200 using the hardware extensions 102. Application 210 includes a compression task 212 and a decompression task 214. Processing device 200 receives raw video information, either from another circuit, such as a CCD, or from an external video feed. Compression task 212 includes motion prediction code 216 predicts motion of image blocks between frames. The compression task 212 is executed by the processor core; whenever the motion estimation function (in this case, a MAD function) is specified by the compression task, that function is handled by the motion estimation extension 202, which downloads the necessary data from the data section 104*b* of the local memory 104 and returns the result to the processor core 12. Similarly, whenever the motion prediction code 216 specifies a pixel interpolation function, that function is handled by the PI extension 204, which also downloads the necessary data from the data section 104*b* of the local memory 104 and returns the result to the processor core 12.

In the Spatial Compression code 218, whenever a transform coding function (DCT function) is specified in the code, the function is handled by the transform coding extension 206. Again, data is taken by the transform coding extension 206 from data memory 104b, and the results are returned to the core 12 for further processing by the spatial compression code 218.

Decompression task 214 includes spatial decompression code 220 and enhancement code 222. As in the compression task, the iDCT and PI functions are handled by the transform coding extension 206 and PI extension 204, respectively. The results from the extensions 204 and 206 are used by other parts of the code.

The hardware extensions can eliminate significant amounts of code for a given video application, and can execute functions much more efficiently than a typical processor core. In some applications, it is estimated that the extensions 202, 204 and 206 can cover 80% of the total cycles of a target application by accelerating DSP kernels that consume most of the cycles. Importantly, the functionality of the extensions can be accessed as simply as any other instruction in the code. The extensions 102 share local memory accesses as other units and deliver results to the processing core 12 to be used by either other software or other hardware kernels. The execution of code in the extensions 102 can be fully visible in the main software tool suite that comes with the core 12. Identification mechanisms can be designed to allow automatic tracking of the availability of the extensions and to trap errors in real-time (allowing real-time configuration of the application according to computation resources available in the hardware platform.

While the motion prediction code predicts motion from frame to frame in the temporal direction, spatial compression code 218 organizes redundancy in the spatial direction. Whenever the spatial compression code 218 specifies a transform coding (DCI) function, that function is handled by the transform coding extension 206, using the local memory 104b.

A primary benefit of the extension 102 is that they can substantially reduce power associated with image/video processing, or increase performance at the same power. The additional cost in hardware is estimated to be less than 20% of the gate count of a typical device.

Figure 19:
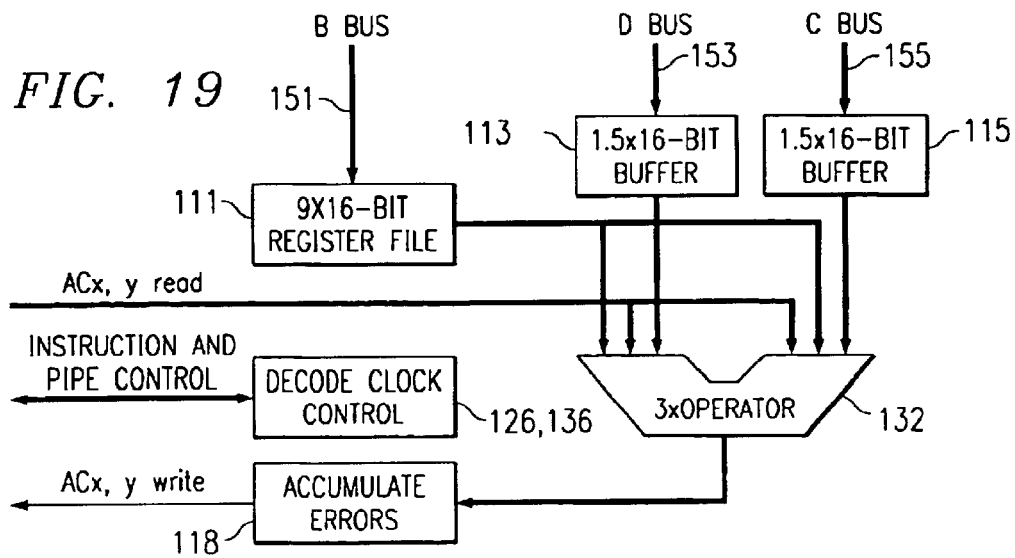
FIG. 19 illustrates a block diagram of a motion estimation extension.

FIG. 19 illustrates a block diagram of the motion estimation extension 202. The motion estimation extension 202 can be implemented using the embodiment shown in FIG. 2. In this embodiment, the B bus 151 is coupled to a 9×16 register file 111, the D bus 153 is coupled to a 1.5×16-bit (i.e., a three byte) buffer 113 and the C bus is coupled to a 1.5×16-bit buffer 115. Register file 11 and buffers 113 and 115 are coupled to operators (three) 132. The output of operators 132 is coupled to accumulator 118 of the processing core 12.

In operation, this embodiment allows single cycle processing of up to three errors. The reference window for pixels can be either square or rectangular, but is limited to 256 pixels, due to the size of the error computation hardware (16 bit datapath). The circuit could be modified, of course, for larger reference windows. As shown, the supported data types are 8-bit pixels for reference and search windows and three 16-bit errors.

In order to compute three errors per cycle, three identical operators are called in parallel and using a pipelined mode. These operators are computing following expression:

Error($n$)=Error($n$−1)+abs($Pr(k)$−$Ps(m)$)+abs($Pr(k$+1$)$−$Ps(m$+1$)$)

where, Error is the cumulated error value, Pr( ) is the set of reference pixels, and Ps( ) is the set of search pixels. The reference pixels are accessed via B bus 151 and stored in the register file 111, the search pixels are accessed via the C and D buses 155 and 153.

The pipeline latency is dependent upon the distance <<d>> of the search strategy. All operators are fully working in parallel immediately when d is equal to 1, but require <<d>> cycles when d is greater. The table below shows the pixels fetch history and the loading of operators for d=4 (2 pixels are supposed to be carried on a 16 bit bus):

TABLE 9

| Reference Pixels | Search pixels | loading of operators | Cycle |
| --- | --- | --- | --- |
| Pr(0), Pr(1) | Ps(−4), Ps(−3) | Op0 | #1 |
| Pr(2), Pr(3) | Ps(−2), Ps(−1) | Op0 | #2 |
| Pr(4), Pr(5) | Ps(0), Ps(1) | Op0 Op1 | #3 |
| Pr(6), Pr(7) | Ps(2), Ps(3) | Op0 Op1 | #4 |
| Pr(8), Pr(9) | Ps(4), Ps(5) | Op0 Op1 Op2 | #5 |
| Pr(10), Pr(11) | Ps(6), Ps(7) | Op0 Op1 Op2 | #6 |
| ... | | | |

This history of pixels shows also that there is a natural re-use of reference pixels that one can take advantage from. For instance, in the first cycle Pr(0) and Pr(1) are used by Op0. They are also used in cycle 3 by Op1 and in cycle 5 by Op2. Thus, the reference pixels are stored locally in the Hardware Accelerator, in a 10-word delay-line (16 bits wide). This delay line has several output locations that are defined according to above latency. The pairs of pixels circulate in the delay-line by shifting to the next register. Pixels getting off the line are lost.

In order to manage the special case of unaligned fetches in the search window (d=1), the search pixels are stored locally on a 16 bit buffer which also has an 8 bit delay on the LSB (least significant bit) side. Using this buffer and triggering operators one cycle later, the computations fall back in the <<aligned>> case.

The performance of the Accelerator for several types of search methods and a macroblock of 16×16 pixels is summarized in the table below:

TABLE 10

| Full Search (window +/−1 pel) | 444 |
| Fast Search (window +/−7 pels) | 1338 |
| Fast Search (window +/−15 pels) | 1806 |

The sequence of operations to perform the complete search is:

Select <<d>>, call the Hardware accelerator for <<d>>and generate the 9 errors table, compute the minimum of the 9 error results, select new <<d>> and, start above process around the minimum location.

Figure 20:
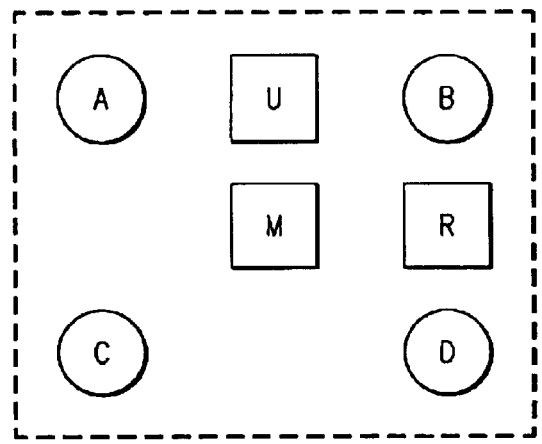
FIG. 20 illustrates a square of four pixels, A, B, C and D, and the sub-pixels, U, M, and R, generated using a half-pixel interpolation method.

FIG. 20 illustrates a square of four pixels A, B, C and D, and the sub-pixels, U, M, and R, which are generated from the square of pixels using a half-pixel interpolation method. The equations for calculating the sub-pixel values are:

$$U = \frac{A + B + Rnd}{2}$$

$$M = \frac{A + B + C + D + 1 + Rnd}{4}$$

$$R = \frac{B + D + Rnd}{2}$$

Depending on the controls given to the PI extension 204 during Init phase, results can optionally be rounded by addition of ½ LSB (i.e., setting Rnd to 1), so that pixel resolution is kept.

While a half-pixel interpolation method is described herein, other interpolation methods, such as a quarter-pixel interpolation method could be implemented in the PI extension 204 as well.

Figure 21:
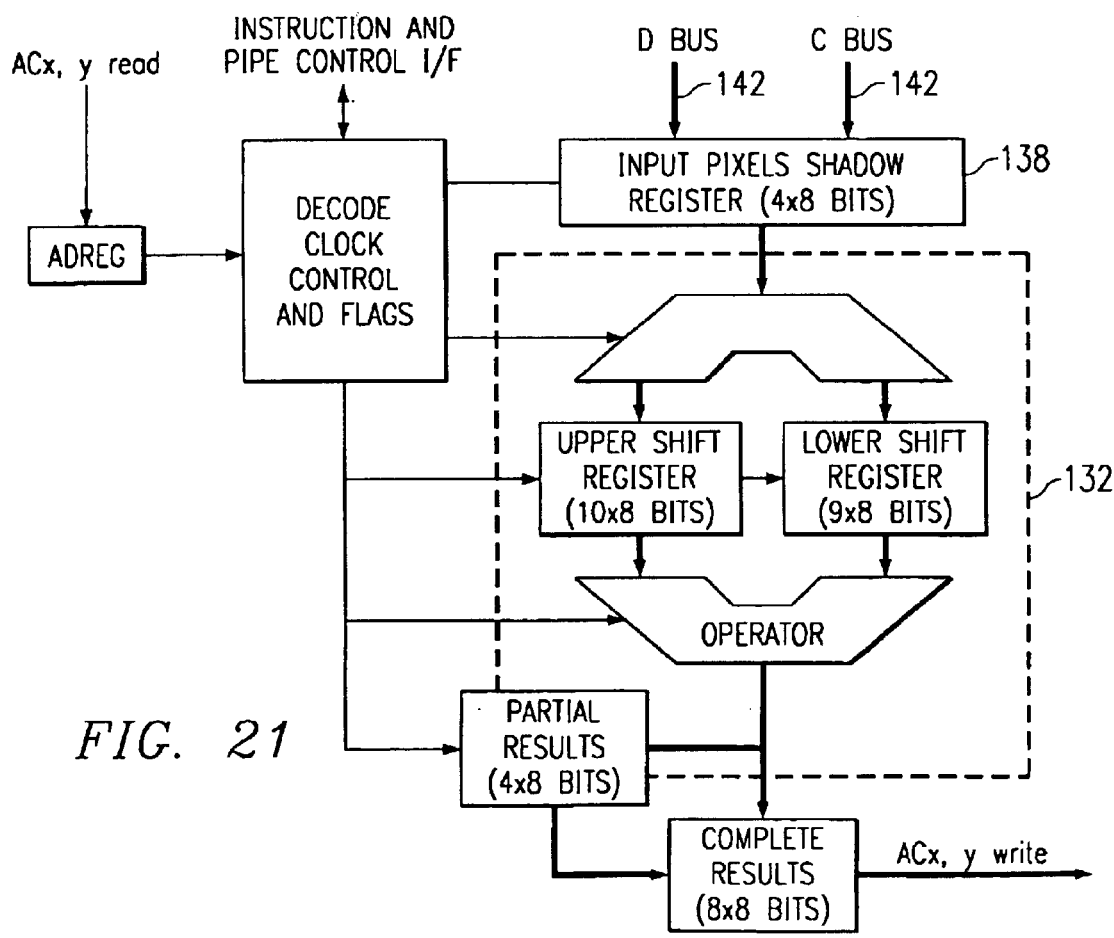
FIG. 21 illustrates a block diagram of a pixel interpolation extension.

FIG. 21 illustrates an embodiment of the PI extension 204. This extension can take use the structure shown in FIG. 2. In this case, the operator of the floating point kernel performs the function (rnd((A+B)/2, rnd((A+B+C+D+1)/4) and rnd((C+D)/2). The original pixels are retrieved from the local memory 104 using the C and D buses.

In the illustrated embodiment, the data types supported are 8-bit pixels for inputs pixels, 10-bit for intermediate results, and 8 bit pixels as final results (rounded). The internal datapath supports 10 bits operations for full accuracy.

To obtain a full Pixel Interpolation on a X×X pixels block, the previous equations are applied on the (X+2)×(X+2) corresponding block. For interpolation of an original block of 16×16 pixels, the "extended" original block (the "macroblock plus crown" or MBC) will be 18×18 pixels and the interpolated block will be 33×33.

The block does not have to be stored locally; it may be directly fetched from the full image zone of the local memory 104.

Figure 22:
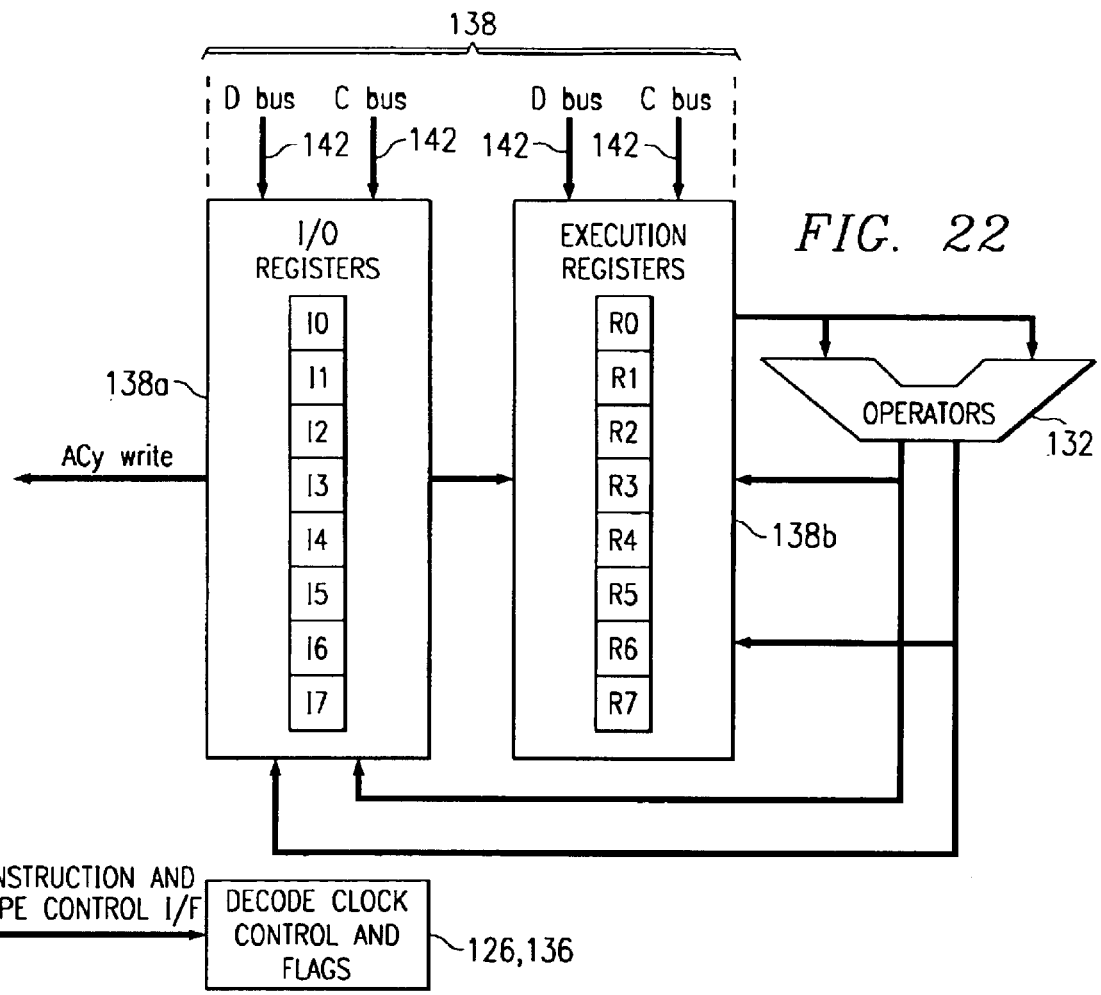
FIG. 22 illustrates a block diagram of a transform coding extension.
Figure 24:
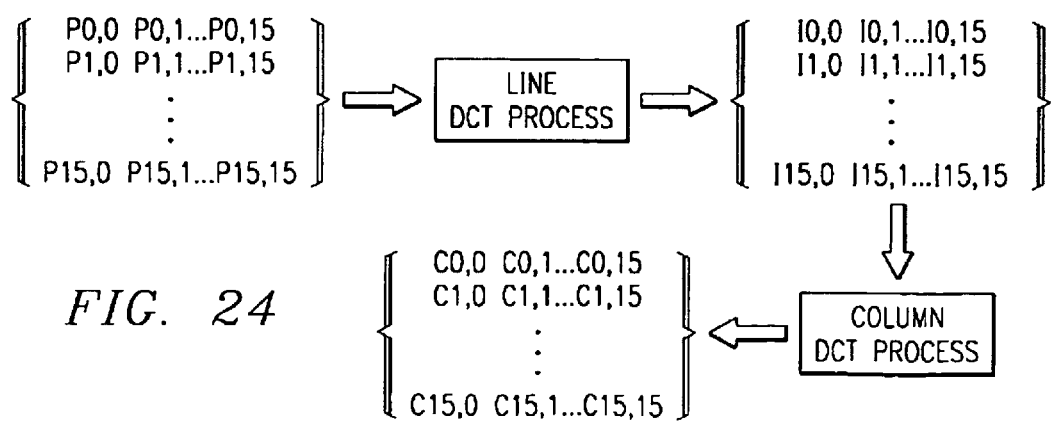

FIG. 22 illustrates a block diagram of the transform coding extension 206 (implementing a DCT/iDCT calculation). The transform coding extension 206 implementing DCT/iDCT transforms can be of the type shown in FIG. 2, wherein the D and C buses 142 are input to register files 138, including I/O registers 138*a* and execution registers 138*b*.

DCT/iDCT functions have been widely studied and several optimized versions exist for specific data sizes. These versions generally minimize the number of chained multiplies in order to avoid problem of accuracy (for the iDCT), while keeping the multiplier size small. The hardware accelerator described in this specification is meant to support various configurations of image blocks, ranging from 4×4 pixels to 16×16. It uses a recursive scheme which is described below (for 4 and 8 points) and which is adapted to support 16-bit signed input data for both DCT and iDCT. Internal datapaths are defined so that accuracy is maintained, following H.263 function recommendations for iDCT.

Figure 23A:
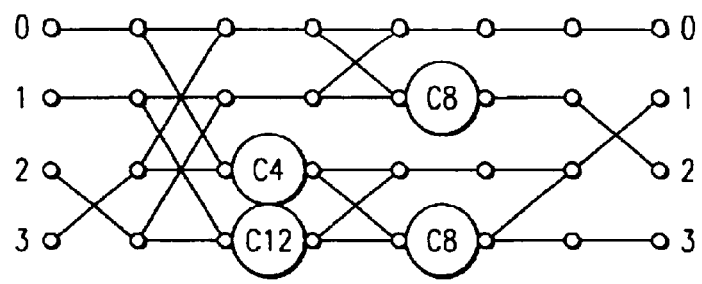
Figure 23B:
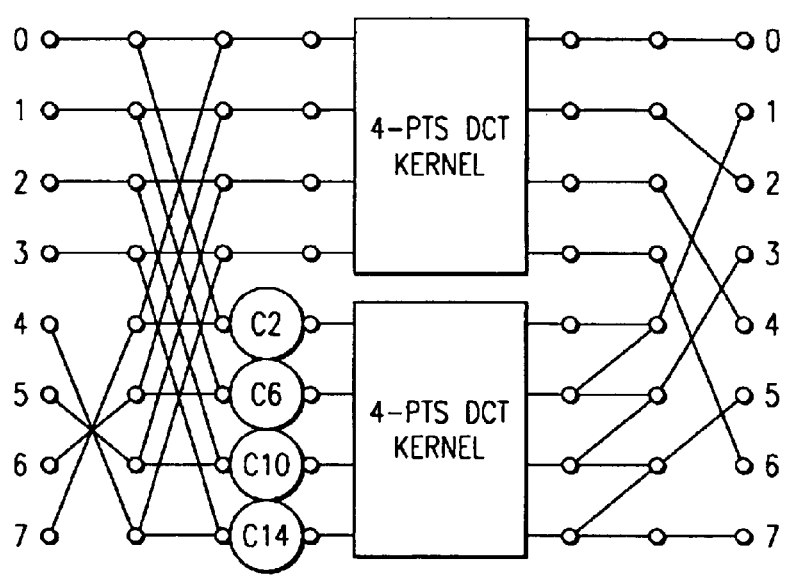
Figure 23C:
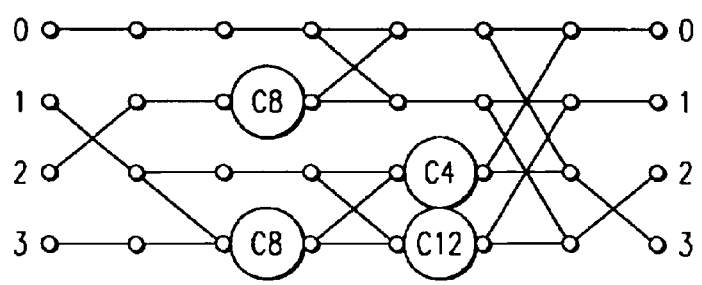

FIG. 23*a* illustrates a 4-points DCT kernel, FIG. 23*b* illustrates an 8-points DCT, using the kernel of FIG. 24*a*, and FIG. 23*c* illustrates a 4-points iDCT kernel. In FIGS. 23*a–c*, the cosine transform coefficients Ck are of the form $Ck=1/(2*\cos(kn/32))$. They are hardcoded with the right precision in the hardware accelerator.

The data types supported are 16 bit input operands for block lines or columns, internal 18-bit coefficients (15 Ck's), 18-bit×18-bit multiplies, and 32-bit internal datapaths.

The DCT/iDCT hardware organization is designed to reduce datapath length between two cycles. The features used to reach this target are eight parallel datapath lines, multiplications and add/subtracts performed in different cycles, use of multipliers by constants and datapath width limited to 28 bits instead of 32 bits.

With this the architecture contains the following resources: (1) nine multipliers by constant, (2) four adders with rounding, (3) four add/subtracts with rounding, (4) 8×28-bit execution registers for datapath, (5) 8×16-bit I/O registers for buffering communication with CPU and memory, and (6) 1×14-bit address register for emulation mode.

Loads and stores are performed in parallel of computations. Loads directly come from memory. Stores are buffered in C55x accumulators before being written into memory. A typical sequence for a 4×4 block 2D-DCT, with 2 4-pts DCT running at a time, is:

| Input Pixels (16-bits) | Phase number | Output data (16 bits) | Cycle |
|---|---|---|---|
| P(0,0), P(1,0) | (load) | — | #1 |
| P(2,0), P(3,0) | (load) | — | #2 |
| P(0,1), P(1,1) | (load) | — | #3 |
| P(2,1), P(3,1) | (load) | — | #4 |
| P(0,2), P(1,2) | 1 | — | #5 |
| — | 2 | — | #6 |
| — | 3 | — | #7 |
| — | 4 | — | #8 |
| — | 5 | — | #9 |
| P(2,2), P(3,2) | 6 | — | #10 |
| P(0,3), P(1,3) | 7 | — | #11 |
| P(2,3), P(3,3) | 8 | — | #12 |
| — | 1 | — | #13 |
| — | 2 | c(0,0), c(0,1) | #14 |
| — | 3 | c(0,2), c(0,3) | #15 |
| — | 4 | c(1,0), c(1,1) | #16 |
| — | 5 | c(1,2), c(1,3) | #17 |
| — | 6 | — | #18 |
| — | 7 | — | #19 |
| — | 8 | — | #20 |
| c(0,0), c(1,0) | (load) | — | #21 |
| — | (store) | c(2,0), c(2,1) | #22 |
| — | (store) | c(2,2), c(2,3) | #23 |
| Modes sequence | | | |
| — | (store) | c(3,0), c(3,1) | #24 |
| — | (store) | c(3,2), c(3,3) | #25 |
| c(2,0), c(3,0) | (load) | — | #26 |
| c(0,1), c(1,1) | (load) | — | #27 |
| c(2,1), c(3,1) | (load) | — | #28 |
| c(0,2), c(1,2) | 1 | — | #29 |
| — | 2 | — | #30 |
| — | 3 | — | #31 |
| — | 4 | — | #32 |
| — | 5 | — | #33 |
| c(2,2), c(3,2) | 6 | — | #34 |
| c(0,3), c(1,3) | 7 | — | #35 |
| c(2,3), c(3,3) | 8 | — | #36 |
| — | 1 | — | #37 |
| — | 2 | l(0,0), l(0,1) | #38 |
| — | 3 | l(0,2), l(0,3) | #39 |
| — | 4 | l(1,0), l(1,1) | #40 |
| — | 5 | l(1,2), l(1,3) | #41 |
| — | 6 | — | #42 |
| — | 7 | — | #43 |
| — | 8 | — | #44 |
| — | — | — | #45 |
| — | (store) | l(2,0), l(2,1) | #46 |
| — | (store) | l(2,2), l(2,3) | #47 |
| — | (store) | l(3,0), l(3,1) | #48 |
| — | (store) | l(3,2), l(3,3) | #49 |

In this case, computation efficiency (ratio between total number of hardware computation cycles and total number of cycles) is equal to 0.41. For an 8×8 2D-DCT, the optimized case along with 8×8 2D-iDCT, it goes up to 0.93. Identical numbers are obtained for iDCT. These figures don't take into account the effect of stalls and local repeats.

All effects included, a 4×4 DCT or iDCT can be accomplished in 87 cycles. An 8×8 DCT or iDCT can be accomplished in 147 cycles.

The sequence of operations to perform a DCT or iDCT is basically a set of calls to the mode sequences packaged in local repeats (loops fit in the instruction buffer of the C55x DSP). The initial macroblock or coefficient matrix is read-in and processed line by line to an intermediate memory buffer (stored by line also). Then transposition in addresses must me done in order to fetch columns of the intermediate matrix. Data read back in is processed, column-by-column this time, in order to generate the final matrix. This is described in FIG. 24.

Figure 25:
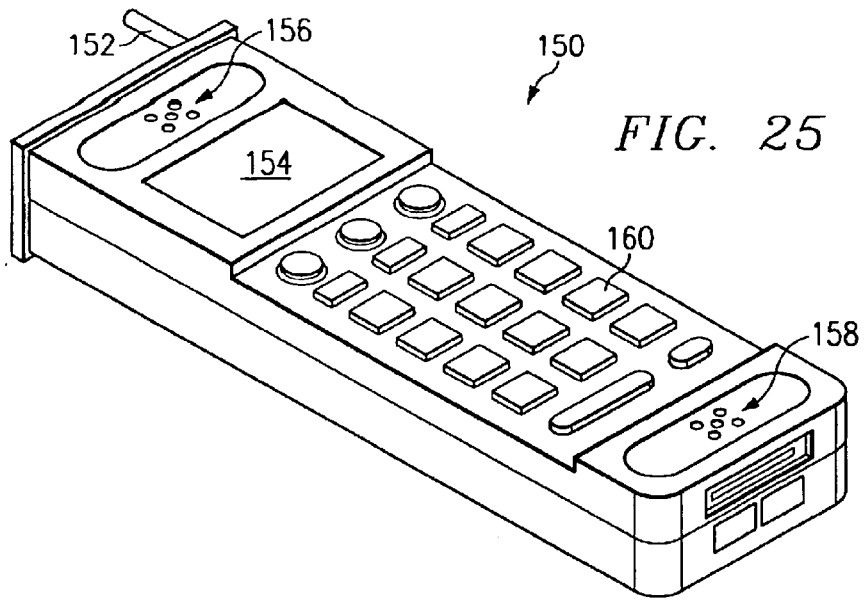
FIG. 25 illustrates a portable telephone that incorporates the present invention.
Figure 26:
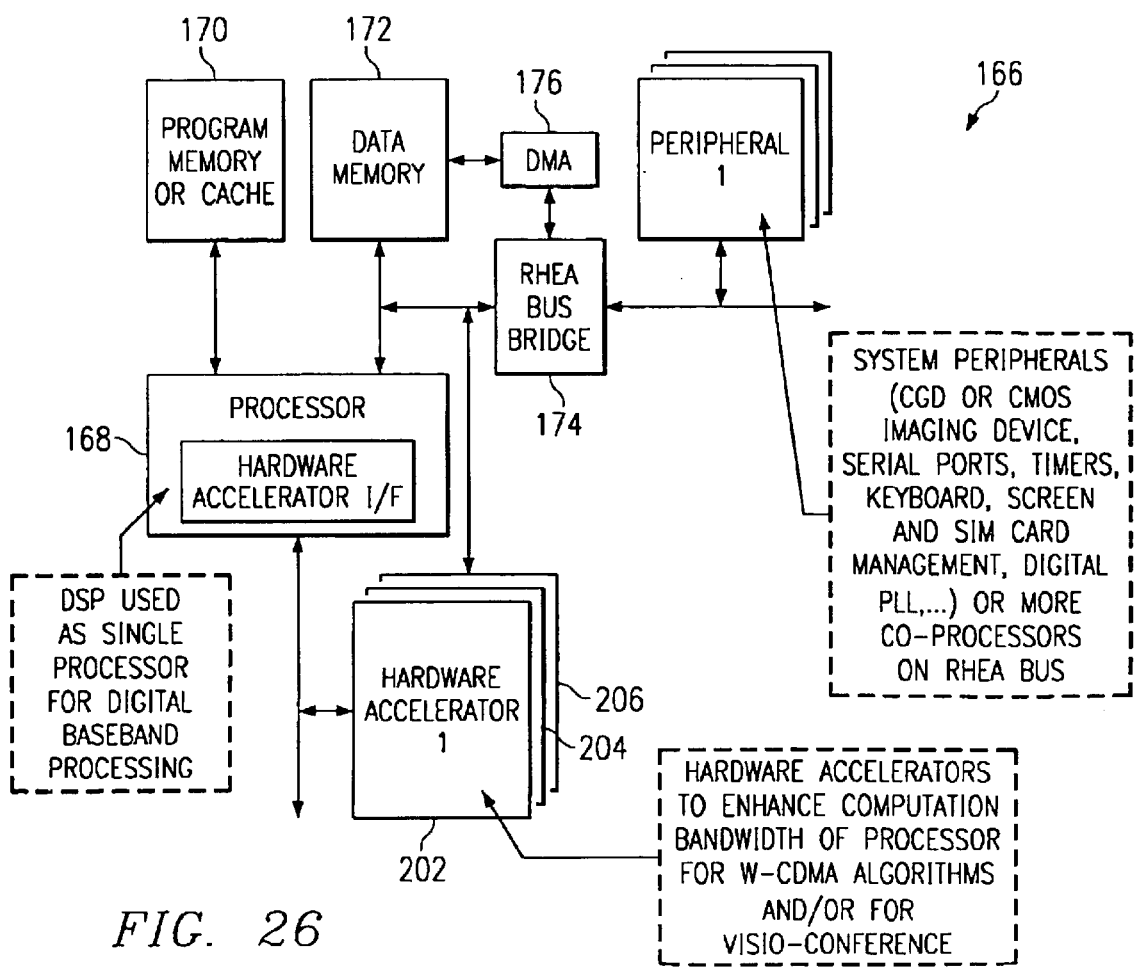
FIG. 26 is a block diagram of various peripherals coupled to processor 168.

FIG. 25 illustrates a portable telephone (shown generally at 150) which incorporates extensions 102 (specifically the ME extension 202, PI extension 204 and transform coding extension 206; other extensions could be used in conjunction with these extensions). FIG. 26 illustrates a block diagram of various peripherals coupled to a processor 168, according an embodiment of the invention. Telephone 150 includes an antenna 152, an LCD display 154, a speaker 156, a microphone 158 and a keyboard 160.

The present invention provides significant advantages over the prior art. First, the hardware accelerators are much more efficient in performing computation-intensive functions than a standard processing core; hence, the functions can be calculated much faster, and at lower power consumption. Second, the additional cost in hardware is very small. In particular, in a video processing application, the advantages of using hardware accelerators for portions of the motion estimation, transform coding and pixel interpolation can be significant. In one test, a circuit using software-only solutions for motion estimation (MAD), transform coding (DCT), and pixel interpolation (half-pixel interpolation), used 43 mA for a frame rate of 15 fps (frames per second), while a circuit using hardware accelerators to perform these same functions used only 21.5 mA, a 50% reduction in power consumption.

In a comparison of a first accelerated hardware configuration including motion estimation (MAD), transform coding (DCT/iDCT) and pixel interpolation (half-pixel interpolation) hardware extensions, a second accelerated hardware configuration including motion estimation (MAD) and transform coding (DCT/iDCT), without pixel interpolation, and a third hardware configuration using software only, the first accelerated hardware configuration used 2186550 cycles, the second hardware solution used 2496150 cycles (a 14% increase) and the software only solution used 4101300 cycles (a 64% increase).

For the example, above, Table 11 illustrates the difference in the MIPs (millions of instructions per second) which are necessary for three different configurations to obtain different frame rates.

TABLE 11

| Configuration→ | Processor with Software only | Processor with hardware acceleration for Motion Estimation (MAD) and Transform Coding (DCT/iDCT) | Processor with hardware acceleration for Motion Estimation (MAD), Pixel Interpolation (half-pixel interpolation) and Transform Coding (DCT/iDCT) |
|---|---|---|---|
| MIPs at 10 fps | 41 MHz | 22 MHz | 25 MHz |
| MIPs at 15 fps | 62 MHz | 33 MHz | 37 MHz |
| MIPs at 30 fps | 123 MHz | 66 MHz | 75 MHz |

As can be seen, the motion estimation and transform coding hardware accelerators provide a significant decrease in the necessary frequency to support a desired frame rate.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. Circuitry for processing images and video, comprising:
   a processor for executing software instructions for processing images or video;
   a random access memory;
   a motion estimation hardware accelerator coupled to said random access memory and the processor for performing motion estimation functions, responsive to a request by the processor, on data from the random access memory and returning a result to the processor for further processing of the video or images in the processor based on the result from the motion estimation hardware accelerator; and
   a transform coding hardware accelerator coupled to said random access memory and the processor for performing transform coding functions, responsive to a request by the processor, on data from the random access memory and returning a result to the processor for further processing of the video or images in the processor based on the result from the transform coding hardware accelerator.

2. The circuitry of claim 1 and further comprising a pixel interpolation hardware accelerator coupled to said random access memory.

3. The circuitry of claim 2 wherein said pixel interpolation hardware accelerator performs a half-pixel interpolation function.

4. The circuitry of claim 1 wherein said motion estimation hardware accelerator includes circuitry for calculating a mean absolute difference function.

5. The circuitry of claim 1 wherein said transform coding hardware accelerator includes circuitry for calculating a direct cosine transform function.

6. The circuitry of claim 5 wherein said transform coding hardware accelerator includes circuitry for calculating an inverse direct cosine transform function.

7. A method of processing video information, comprising the steps of:
   executing a compression task in a programmable processing device coupled to a random access memory;
   upon encountering a motion estimation instruction, initiating execution of an associated function in a motion estimation hardware accelerator, said motion estimation hardware accelerator coupled to said processing device and said random access memory, such that the motion estimation hardware accelerator retrieves image data from the random access memory, performs a motion estimation function on the data, and returns a result to the processor for further processing of the compression task in the processor based on the result from the motion estimation hardware accelerator; and
   upon encountering a transform coding instruction, initiating execution of an associated function in a transform coding hardware accelerator, said transform coding hardware accelerator coupled to said processing device and said random access memory, such that the transform coding hardware accelerator retrieves image data from the random access memory, performs a transform coding function on the data, and returns a result to the processor for further processing of the compression task in the processor based on the result from the transform coding hardware accelerator.

8. The method of claim 7 step of initiating execution of an associated function in the motion estimation hardware accelerator includes the step of retrieving image data from a data portion of said random access memory into said motion estimation hardware accelerator.

9. The method of claim 7 step of initiating execution of an associated function in the transform coding hardware accelerator includes the step of retrieving image data from a data portion of said random access memory into said transform coding hardware accelerator.

10. The method of claim 7 and further comprising the step of, upon encountering a pixel interpolation instruction, initiating execution of an associated function in a pixel interpolation hardware accelerator, said pixel interpolation hardware accelerator coupled to said processing device and said random access memory, such that the pixel interpolation hardware accelerator retrieves data from the random access memory, performs an interpolation function on the data, and returns a result to the processor.

11. The method of claim 10 wherein said step of initiating execution of an associated function in a pixel interpolation hardware accelerator includes the step of performing a half-pixel interpolation function.

12. The method of claim 7 wherein said step of initiating execution of an associated function in a motion estimation hardware accelerator includes the step of performing a mean absolute difference function.

13. The method of claim 7 wherein said step of initiating execution of an associated function in a transform coding hardware accelerator includes the step of performing a direct cosine transform function.

14. The method of claim 13 wherein said step of initiating execution of an associated function in a transform coding hardware accelerator includes the step of performing an inverse direct cosine transform function.

15. Circuitry for processing images and video, comprising:
   a processor for executing a program of software instructions for processing images or video;
   a random access memory coupled to said processor;
   two or more hardware accelerators coupled to said processor, said hardware accelerators for performing certain video processing functions associated with ones of the software instructions; and
   wherein certain software instructions can be processed by either the processor or by one of said hardware accelerators subsequent to said one of said hardware accelerators being enabled to process the certain software instructions where the decision to process the certain software instruction in the processor is made in real-time.

* * * * *